(12) United States Patent
Inohara et al.

(10) Patent No.: US 8,247,465 B2
(45) Date of Patent: Aug. 21, 2012

(54) HEAT-EXPANDABLE MICROSPHERES, PROCESS FOR PRODUCING THE SAME, AND APPLICATION THEREOF

(75) Inventors: Takeshi Inohara, Yao (JP); Yoshiaki Shirakabe, Yao (JP); Ikuo Yosejima, Yao (JP); Kenichi Kitano, Yao (JP); Toshiaki Masuda, Yao (JP)

(73) Assignee: Matsumoto Yushi-Seiyaku Co., Ltd., Yao-Shi (JP)

( * ) Notice: Subject to any disclaimer, the term of this patent is extended or adjusted under 35 U.S.C. 154(b) by 347 days.

(21) Appl. No.: 12/679,661

(22) PCT Filed: Oct. 9, 2008

(86) PCT No.: PCT/JP2008/002847
§ 371 (c)(1),
(2), (4) Date: Mar. 23, 2010

(87) PCT Pub. No.: WO2009/050863
PCT Pub. Date: Apr. 23, 2009

(65) Prior Publication Data
US 2010/0204349 A1    Aug. 12, 2010

(30) Foreign Application Priority Data
Oct. 16, 2007  (JP) .................................. 2007-268476

(51) Int. Cl.
C08J 9/16     (2006.01)
C08J 9/20     (2006.01)
C08J 9/224    (2006.01)

(52) U.S. Cl. ............... 521/56; 521/57; 521/76; 428/402

(58) Field of Classification Search ................... 521/56, 521/57, 76; 428/402
See application file for complete search history.

(56) References Cited

U.S. PATENT DOCUMENTS

| | | |
|---|---|---|
| 3,615,972 A | 10/1971 | Morehouse et al. |
| 5,834,526 A | 11/1998 | Wu et al. |
| 5,861,214 A | 1/1999 | Kitano et al. |
| 6,235,394 B1 | 5/2001 | Shimazawa et al. |
| 2005/0026067 A1* | 2/2005 | Masuda et al. ................ 430/138 |
| 2005/0080151 A1* | 4/2005 | Miki et al. ....................... 521/50 |
| 2007/0154711 A1 | 7/2007 | Masuda et al. |
| 2007/0219281 A1 | 9/2007 | Ejiri et al. |
| 2009/0280328 A1* | 11/2009 | Masuda et al. ................ 428/407 |

FOREIGN PATENT DOCUMENTS

| | | | |
|---|---|---|---|
| EP | 1676880 A1 * | 7/2006 | |
| EP | 1 947 121 A1 | 7/2008 | |
| EP | 1 964 903 A1 | 9/2008 | |
| JP | S42-26524 A1 | 12/1967 | |
| JP | S56-143229 A1 | 11/1981 | |
| JP | S62-201231 A | 9/1987 | |

(Continued)

Primary Examiner — Randy Gulakowski
Assistant Examiner — Kara Boyle
(74) Attorney, Agent, or Firm — Global IP Counselors, LLP

(57) ABSTRACT

Heat-expandable microspheres include a shell of thermoplastic resin and core material encapsulated in the shell. The core material include a blowing agent having a boiling point not higher than the softening point of the thermoplastic resin and a gas migration inhibitor having a boiling point higher than the softening point of the thermoplastic resin. The ratio of the gas migration inhibitor to the core material is at least 1 weight percent and below 30 weight percent. The average particle size of the heat-expandable microspheres ranges from 1 to 100 micrometers.

27 Claims, 1 Drawing Sheet

FOREIGN PATENT DOCUMENTS

| | | |
|---|---|---|
| JP | H05-329360 A1 | 12/1993 |
| JP | 2002-511900 A1 | 4/2002 |
| JP | 2003-001098 A1 | 1/2003 |
| JP | 2004-105858 A1 | 4/2004 |
| JP | 2006-096963 A1 | 4/2006 |
| JP | 2006-213930 A1 | 8/2006 |
| JP | 2007-131688 A1 | 5/2007 |
| WO | WO-99/43758 A1 | 9/1999 |
| WO | WO-2006/030946 A1 | 3/2006 |
| WO | WO 2007032436 A1 * | 3/2007 |
| WO | WO-2007/046273 A1 | 4/2007 |
| WO | WO-2007/072769 A1 | 6/2007 |

* cited by examiner

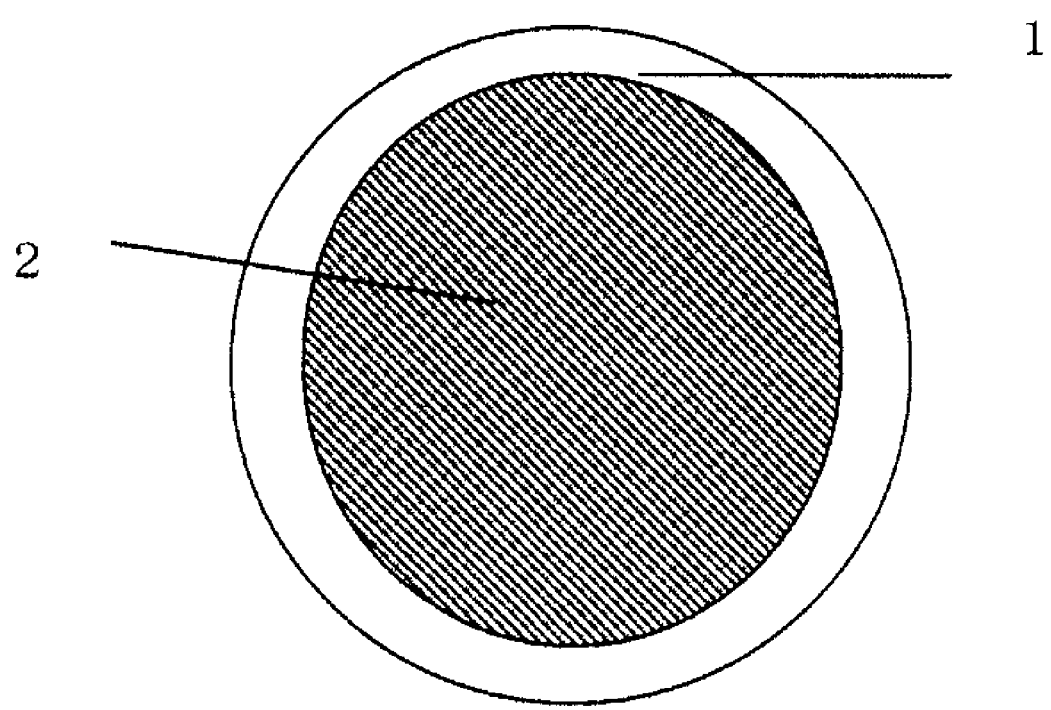

HEAT-EXPANDABLE MICROSPHERES, PROCESS FOR PRODUCING THE SAME, AND APPLICATION THEREOF

CROSS-REFERENCE TO RELATED APPLICATIONS

This U.S. National stage application claims priority under 35 U.S.C. §119(a) to Japanese Patent Application No. 2007-268476, filed in Japan on Oct. 16, 2007, the entire contents of which are hereby incorporated herein by reference.

TECHNICAL FIELD

The present invention relates to heat-expandable microspheres, a process for producing the same, and application thereof.

TECHNICAL BACKGROUND

Researchers have studied various heat-expandable microcapsules (or heat-expandable microspheres) each comprising a shell of thermoplastic resin and a blowing agent which is encapsulated in the shell and gasifies at a temperature not higher than the softening point of the thermoplastic resin. For example, JP B 42-26524 discloses heat-expandable microcapsules and a basic production process thereof, and U.S. Pat. No. 3,615,972 discloses heat-expandable microcapsules having a shell of uniform thickness. Further, WO 99/43758 discloses heat-expandable microcapsules, which comprise a shell of thermoplastic resin in which functional groups are crosslinked, and a production process thereof.

Those heat-expandable microcapsules mentioned above have a problem that they fail to exhibit desirable expanding performance as the result of reduced maximum expansion ratio which is caused by heat history they undergo before their thermal expansion. They undergo heat history when they are stored at comparatively high temperature (though it is lower than a temperature at which they start thermal expansion) or are exposed to comparatively high temperature in mixing with resins which generate heat in the mixing operation. Thus those heat-expandable microcapsules should be stored at cool place, and they should be mixed with resins under a controlled mixing temperature so as to avoid the reduction of their thermal expanding performance such as expansion ratio which is caused by heat generated in the mixing.

SUMMARY OF INVENTION

Technical Problem

The object of the present invention is to provide heat-expandable microspheres which hold a reduction of their thermal expanding performance such as expansion ratio to a minimum level when they undergo heat history prior to their thermal expansion; a process for producing the same; and application thereof.

Technical Solution

The inventors of the present invention have studied diligently to solve the problems described above, and found that heat-expandable microspheres in which a gas migration inhibitor and a blowing agent are encapsulated solve the problems mentioned above. Thus the inventors have achieved the present invention.

The heat-expandable microspheres of the present invention each comprises a shell of thermoplastic resin and core material encapsulated in the shell. The core material comprises a blowing agent having a boiling point not higher than the softening point of the thermoplastic resin and a gas migration inhibitor having a boiling point higher than the softening point of the thermoplastic resin. The heat-expandable microspheres have an average particle size ranging from 1 to 100 micrometer.

The weight ratio of the gas migration inhibitor should preferably range from 1 weight percent to less than 30 weight percent of the total of the core material. The initial boiling point of the gas migration inhibitor should preferably be 180 deg.C. or higher.

The weight ratio of the gas migration inhibitor can range from 1 weight percent to 80 weight percent of the core material.

The gas migration inhibitor should preferably be at least one substance selected from the group consisting of naphthenic oils, paraffinic oils, and aromatic oils.

The heat-expandable microspheres of the present invention can have properties of another type of heat-expandable microspheres described below.

Another type of heat-expandable microspheres of the present invention are those each comprising a shell of thermoplastic resin and core material being encapsulated in the shell, and having an average particle size ranging from 1 to 100 micrometer. The core material essentially comprises a blowing agent having a boiling point not higher than the softening point of the thermoplastic resin. In the case that the expansion-initiating temperature of such heat-expandable microspheres is represented by Ts (deg.C.), the maximum expansion ratio of the heat-expandable microspheres is represented by A (times), and the maximum expansion ratio of the heat-expandable microspheres after heating at a temperature, T (deg.C.) in the range of $(Ts-15) \leq T < Ts$, for 10 minutes and cooling down to room temperature is represented by B (times), the ratio of B to A, i.e., B/A, should be at least 0.7.

If the true specific gravity of the heat-expandable microspheres after the heating mentioned above is represented by "d" and the true specific gravity of the heat-expandable microspheres before the heating is represented by "$d_0$", the ratio of d to $d_0$, or $d/d_0$, should preferably range from 0.5 to 1.3.

The thermoplastic resin should preferably be obtained by polymerizing a polymerizable component, and the polymerizable component should preferably comprise at least one monomer selected from the group consisting of nitrile monomers, (meth)acrylate monomers, carboxyl-group-containing monomers, styrene monomers, vinyl acetate, (meth)acrylamide monomers, maleimide monomers, and vinylidene chloride.

The maximum-expansion temperature of the heat-expandable microspheres preferably ranges from 120 to 240 deg.C.

The shell of the heat-expandable microspheres should preferably further comprises a particulate filler being adhered on its outer surface.

The process for producing the heat-expandable microspheres, each comprising a shell of thermoplastic resin and core material encapsulated in the shell, of the present invention comprises the step of polymerizing a polymerizable component into thermoplastic resin in an aqueous dispersion medium, in which the polymerizable component and the core material are dispersed. The core material contains a blowing agent having a boiling point not higher than the softening point of the thermoplastic resin and a gas migration inhibitor having a boiling point higher than the softening point of the thermoplastic resin.

The weight ratio of the gas migration inhibitor should preferably range from 1 weight percent to less than 30 weight percent of the core material. The initial boiling point of the gas migration inhibitor should preferably be 180 deg.C. or higher.

The weight ratio of the gas migration inhibitor can range from 1 weight percent to 80 weight percent of the core material.

The gas migration inhibitor should preferably be at least one substance selected from the group consisting of naphthenic oils, paraffinic oils, and aromatic oils.

The polymerizable component should preferably contain at least one monomer selected from the group consisting of nitrile monomers, (meth)acrylate monomers, carboxyl-group-containing monomers, styrene monomers, vinyl acetate, (meth)acrylamide monomers, maleimide monomers, and vinylidene chloride.

The process should preferably further comprise the step of adhering a particulate filler on the outer surface of the shell of microspheres.

The hollow microspheres of the present invention are manufactured by thermally expanding the heat-expandable microspheres mentioned above and/or the heat-expandable microspheres produced in the process for producing heat-expandable microspheres mentioned above.

The composition of the present invention comprises a base component except diene rubbers and the heat-expandable microspheres and/or the hollow microspheres mentioned above.

The formed products of the present invention are manufactured by giving particular shapes to the composition.

Advantageous Effects

The heat-expandable microspheres of the present invention have excellent expanding performance such as high expansion ratio, and hold the reduction of their expanding performance which is caused by heat history they undergo before their thermal expansion.

The process for producing the heat-expandable microspheres of the present invention efficiently produce heat-expandable microspheres, which have excellent expanding performance such as high expansion ratio and hold the reduction of their expanding performance caused by heat history they undergo their thermal expansion.

The hollow microspheres of the present invention are manufacture by thermally expanding the heat-expandable microspheres mentioned above and/or the heat-expandable microspheres produced in the process for producing heat-expandable microspheres mentioned above, and have excellent heat resistance which promises their improved pressure resistance under high-temperature atmosphere. The hollow microspheres of the present invention hold gas migration from them or their collapse to a minimum degree, and need no excessive heating for expansion so as to result in less yellowing than conventional microspheres.

The composition of the present invention, which contains the heat-expandable microspheres and/or the hollow microspheres, has excellent heat resistance and results in minimum void generation which is caused by gas migration from the microspheres while heating the composition. In addition, the composition exhibits minimum degree of dimensional change caused by re-expansion or shrinkage of the microspheres.

The formed products of the present invention yellow to a minimum degree as they are manufactured by giving specific shapes to the composition mentioned above.

BRIEF DESCRIPTION OF DRAWINGS

FIG. 1 Diagram illustrating an example of the heat-expandable microspheres of the present invention

DETAILED DESCRIPTION OF THE INVENTION

[Process for Producing Heat-Expandable Microspheres]

The process for producing heat-expandable microspheres of the present invention produces heat-expandable microspheres each comprising a shell of thermoplastic resin and core material encapsulated in the shell. The method of the present invention comprises the step of polymerizing a polymerizable component in an aqueous dispersion medium, in which the polymerizable component and the core material are dispersed.

The core material includes a blowing agent having a boiling point not higher than the softening point of the thermoplastic resin and a gas migration inhibitor having a boiling point higher than the softening point of the thermoplastic resin.

The blowing agent is not specifically restricted except that it is a substance having a boiling point not higher than the softening point of the thermoplastic resin, and includes, for example, $C_1$-$C_{12}$ hydrocarbons and their halides, tetraalkyl silanes, and compounds which thermally decompose to generate gas. One of or a combination of at least two of those blowing agents can be used.

The examples of the $C_1$-$C_{12}$ hydrocarbons are propane, cyclopropane, propylene, butane, normal butane, isobutane, cyclobutane, normal pentane, cyclopentane, isopentane, neopentane, normal hexane, isohexane, cyclohexane, heptane, cycloheptane, octane, isooctane, cyclooctane, 2-methylpentane, 2,2-dimethylbutane, and petroleum ether. These hydrocarbons can have any of a linear, branched or alicyclic structure, and aliphatic hydrocarbons are preferable.

The halides of $C_1$-$C_{12}$ hydrocarbons include methyl chloride, methylene chloride, chloroform, and carbon tetrachloride.

The tetraalkylsilanes include, for example, silanes having $C_1$-$C_5$ alkyl groups, such as tetramethylsilane, trimethylethylsilane, trimethylisopropylsilane, and trimethyl-n-propylsilane.

The compounds which thermally decompose to generate gas include, for example, azodicarbonamide, N,N'-dinitrosopentamethylenetetramine, and 4,4'-oxybis (benzenesulfonyl hydrazide).

The boiling point of the blowing agent is not specifically restricted so far as it is not higher than the softening point of the thermoplastic resin, and preferably ranges from −30 deg.C. to 120 deg.C., more preferably from −25 deg.C. to 100 deg.C., further more preferably from −20 deg.C. to 80 deg.C., and most preferably from −15 deg.C. to 60 deg.C. A blowing agent having a boiling point lower than the preferable ranges may not be sufficiently encapsulated in microspheres, and may make the resultant microspheres susceptible to heat history to reduce their expanding performance. On the other hand, a blowing agent having a boiling point higher than the preferable ranges may not readily gasify in microspheres so as to reduce their expanding performance.

The gas migration inhibitor prevents the blowing agent in the core material from migrating out of heat-expandable microspheres through their shells of thermoplastic resin when the microspheres undergo heat history before their thermal expansion, and thus holds the reduction of the thermal expanding performance, such as expansion ratio, of the microspheres.

The preventive action mentioned above, in other words, gas migration inhibiting effect, is attributed to the boiling point of the gas migration inhibitor which is higher than the softening point of the thermoplastic resin. Owing to the high boiling point, the gas migration inhibitor resists gasification in heat-expandable microspheres and forms coating film on the inner surface of the shell of the microspheres so as to prevent the blowing agent from migrating out of the microspheres through the shell when the heat-expandable microspheres undergo heat history before their thermal expansion.

The (weight-average) molecular weight of the gas migration inhibitor should preferably be not lower than 110, more preferably not lower than 120, further more preferably not lower than 150, even more preferably not lower than 180, and most preferably not lower than 200. A gas migration inhibitor having a molecular weight lower than 110 may fail to sufficiently inhibit gas migration from microspheres and make microspheres susceptible to heat history.

The boiling point of the gas migration inhibitor should preferably be not lower than 100 deg.C., more preferably not lower than 110 deg.C., further more preferably not lower than 130 deg.C., even more preferably not lower than 150 deg.C., and most preferably not lower than 180 deg.C. A gas migration inhibitor having a boiling point lower than 100 deg.C. will function as a blowing agent in the resultant heat-expandable microspheres rather than as a gas migration inhibitor so that the heat-expandable microspheres contain excessive amount of blowing agents. Excessive amount of blowing agents can decrease the expansion initiating and maximum-expansion temperatures of the heat-expandable microspheres and deteriorate their thermal expanding performance such as expansion ratio.

The gas migration inhibitor is not specifically restricted so far as it is a substance having a boiling point higher than the softening point of the thermoplastic resin, and includes, for example, hydrocarbon compounds, carboxylic compounds, ester compounds, and alcohol compounds. The gas migration inhibitor comprises one of or a combination of at least two of those compounds.

The examples of the hydrocarbon compounds are aliphatic hydrocarbons, aromatic hydrocarbons, and mixtures of hydrocarbons derived from mineral oils.

The examples of the aliphatic hydrocarbons are tridecane, tetradecane, pendadecane, hexadecane, heptadecane, octadecane, nonadecane, eicosane, pentacosane, tricontane, and tetracontane.

The examples of the aromatic hydrocarbons are benzene, naphthalene, biphenyl, o- or n-terphenyl, dodecylbenzene, tetradecylbenzene, hexadecylbenzene, hexylnaphthalene, and dodecynaphthalene.

The mixtures of hydrocarbons derived from mineral oils are distillates of mixtures containing aliphatic hydrocarbons and/or aromatic hydrocarbons. The (A) initial boiling point, (B) 50-% distillation point, and (C) 95-% distillation point of each of the distillates are not specifically restricted but should preferably be within the following ranges from 1) to 8) for each point where a latter range is more preferable than a former one.

(A) Preferable Ranges for the Initial Boiling Point
1) 100 deg.C. or higher, 2) 130 deg.C. or higher, 3) 150 deg.C. or higher, 4) 180 deg.C. or higher, 5) 190 deg.C. or higher, 6) 200 deg.C. or higher, 7) 220 deg.C. or higher, 8) 240 deg.C. or higher (B) Preferable Ranges for the 50-% Distillation Point
1) 120 deg.C. or higher, 2) 150 deg.C. or higher, 3) 180 deg.C. or higher, 4) 190 deg.C. or higher, 5) 200 deg.C. or higher, 6) 210 deg.C. or higher, 7) 230 deg.C. or higher, 8) 250 deg.C. or higher (C) Preferable Ranges for the 95-% Distillation Point
1) 140 deg.C. or higher, 2) 170 deg.C. or higher, 3) 200 deg.C. or higher, 4) 250 deg.C. or higher, 5) 270 deg.C. or higher, 6) 280 deg.C. or higher, 7) 290 deg.C. or higher, 8) 300 deg.C. or higher Among those boiling and distillation points from (A) to (C), (A) and (C) are more important, and (C) is the most important.

The examples of the mixtures of hydrocarbons derived from mineral oils are processed paraffinic oils such as paraffinic oil, processed naphthenic oils such as naphthenic oil, processed aromatic oils such as aromatic oil, liquid paraffins, petrolatum, Gilsonite™, and petroleum asphalt.

A gas migration inhibitor having any one of the points such as an initial boiling point below 100 deg.C., a 50-% distillation point below 120 deg.C. and a 95-% distillation point below 140 deg.C. has poor function as a gas migration inhibitor. Heat-expandable microspheres containing such gas migration inhibitor greatly reduce their thermal expanding performance such as expansion ratio when they undergo heat history before their thermal expansion. In addition, such heat-expandable microspheres have poor thermal expanding performance even if they do not undergo heat history before their thermal expansion.

The content of hydrocarbons having paraffinic structure (Cp) in the paraffinic oils is not specifically restricted and is preferably at least 40%, more preferably at least 50%, yet more preferably at least 60%, and most preferably at least 90%. Hydrocarbons having paraffinic structure are organic compounds containing saturated or unsaturated chain hydrocarbons (linear and branched) and their substitution products.

The content of hydrocarbons having naphthenic structure (Cn) in the naphthenic oils is not specifically restricted and is preferably at least 50%, more preferably at least 60%, yet more preferably at least 70%, and most preferably at least 90%. Hydrocarbons having naphthenic structure are organic compounds containing cycloalkanes, such as cyclopentane and cyclohexane, and their substitution products obtained by substituting those cycloalkanes or part of them with alkyl or carboxyl groups.

The content of hydrocarbons having aromatic structure (Ca) in the aromatic oils is not specifically restricted and is preferably at least 20%, more preferably at least 40%, yet more preferably at least 50%, and most preferably at least 90%. Hydrocarbons having aromatic structure are organic compounds containing aromatic hydrocarbons, such as benzene, naphthalene, and anthracene, and their derivatives.

The content of the three structures mentioned above can be determined in the method of JIS K 2563.

The kinetic viscosity (at 40 deg.C.) of each of paraffinic oils, naphthenic oils, and aromatic oils is not specifically restricted, and is preferably not higher than 400 $mm^2/S$, more preferably not higher than 300 $mm^2/S$, further more preferably not higher than 200 $mm^2/S$, yet more preferably not higher than 100 $mm^2/S$, and most preferably not higher than 30 $mm^2/S$. An oil having a kinetic viscosity higher than 400 $mm^2/S$ causes difficulty in handling, and high viscosity globules of the oil inhibits sufficient encapsulation of core material so as to reduce the thermal expanding performance such as expansion ratio of the resultant heat-expandable microspheres. The kinetic viscosity can be determined in the method of JIS K 2283.

The paraffinic oils include, for example, series of Cosmo Pure Safety, 10, 10M, 22, 32, 46, 68, 100 and 150, and the series of Cosmo process, 10, 40 and 40C (supplied by Cosmo Oil Co., Ltd.); the series of Nisseki Isozol, 200, 300 and 400 (supplied by Nippon Petrochemical Co., Ltd.); the series of Exxon Naphtha, No. 3, No. 5, No. 6 and No. 7, Exxon Odorless Solvent, and Exxon Rubber Solvent (supplied by Exxon Chemical Co., Ltd.); the series of Super Oil, K 10, K 22, K 32, K 46, K 46N, K 68, K100, K 170, M10, M12, M22, M32, M46, M68, M100, M150, M460, N7, N22, N32, N46, N56, N68, N100, N150, N320, N460, N1000, T10, T46, T68 and Y22 (supplied by Nippon Oil Corporation); the series of IP Solvent, 1016, 1620, 2028 and 2835, and the series of Diana Process Oil, PW-32, PW-90, PW-150, PW-380, PS-32, PS-90, PS-430, PX-32 and PX-90 (supplied by Idemitsu Petrochemical Co., Ltd.); the series of Shintac, PA-95, PA-100 and PA-140 (supplied by Kobe Oil Chemical Industrial Co., Ltd.); the series of Stanol, 40, 43N, 52, 69, 149, LP40 and LP69, and Flexon 845 (supplied by Esso Oil Co., Ltd.); the series of Lubflex, 26, 100 and 400 (supplied by Shell Japan Co., Ltd.); the series of Kyoseki Process, P-200, P-300 and P-500 (supplied by Nikko Kyoseki Co., Ltd.); the series of Sunper, 110, 115, 120, 130, 150, 180, 2100, 2210 and 2280 (supplied by Japan. Sun Oil Company, Ltd.); the series of Fuccol, P-200, P-400 and P-500 (supplied by Fuji Kosan Co., Ltd.); and Mitsubishi 10 and Mitsubishi 12 (supplied by Mitsubishi Oil Co., Ltd.).

The naphthenic oils include, for example, the series of Cosmo Pure Safety, 46N and 68N (supplied by Cosmo Oil Co., Ltd.); Naphtesol L, Naphtesol M, Naphtesol H, and the series of CLESAF OIL, H8, H22, H46, H56, H68, H150, H220, H320, F8, F22, F46, F56, F68, F150, F220 and F320 (supplied by Nippon Petrochemical Co., Ltd.); the series of Diana Process Oil, NS-24, NS-100, NM-26, NM-68, NM-150, NM-280, NP-24, NU-80 and NF-90 (supplied by Idemitsu Kosan Co., Ltd.); the series of Esso Process Oil, 725 and 765 (supplied by Esso Oil Co., Ltd.); the series of Shintac, N-40, N-60, N-70, N-75 and N-85 (supplied by Kobe Oil Chemical Industrial Co., Ltd.); the series of Shellflex, 371JY, 371N, 451, N-40, 22, 22R, 32R, 100R, 100S, 100SA, 220RS, 220S, 260, 320R and 680 (supplied by Shell Japan Co., Ltd.); the series of Kyoseki Process, R-50, R-200 and R-1000 (supplied by Nikko Kyoseki Co., Ltd.); the series of Sunthene, 310, 380, 410, 415, 420, 430, 450, 480, 3215, 4130 and 4240, and Ciro Light R.P.O. (supplied by Japan Sun Oil Company, Ltd.); Comolex No. 2, and the series of Comolex, F22, AF-4, AF-5, AF-6 and AF-7 (supplied by Nippon Oil Corporation); the series of Fuccol, 1150N and 1400N (supplied by Fuji Kosan Co., Ltd.); Mitsubishi 20 (supplied by Mitsubishi Oil Co., Ltd.); the series of Naplex, 32 and 38 (supplied by Mobil Oil Co., Ltd.); and Petrex PN-3 (supplied by Yamabun-Yuka Co., Ltd.).

The aromatic oils include, for example, SAS-296 and the series of Condenser Oil, S and SAS-LH (supplied by Nippon Petrochemical Co., Ltd.); the series of Diana Process Oil, AC-12, AC-60, AE-24, AE-50, AE-200, AH-16 and AH-58 (supplied by Idemitsu Kosan Co., Ltd.); the series of Esso Process Oil, 110 and 120 (supplied by Esso Oil Co., Ltd.); the series of Shintac, HA-10, HA-15, HA-30 and HA-35 (supplied by Kobe Oil Chemical Industrial Co., Ltd.); Cosmo Process 40A (supplied by Cosmo Oil Co., Ltd.); the series of Dutlex, 729UK and 739 (supplied by Shell Japan Co., Ltd.); the series of Kyoseki Process, X100-A and X100 (supplied by Nikko Kyoseki Co., Ltd.); JSO Aroma 790 (supplied by Japan Sun Oil Company, Ltd.); the series of Comolex, 200, 300 and 700 (supplied by Nippon Oil Corporation); the series of Aromax, No. 1, No. 3 and No. 5 (supplied by Fuji Kosan Co., Ltd.); the series of Heavy Process Oil, Mitsubishi 34, Mitsubishi 38 and Mitsubishi 44 (supplied by Mitsubishi Oil Co., Ltd.); the series of Mobilsol, K, 22, 30 and 130 (supplied by Mobil Oil Co., Ltd.); the series of VivaTec, 400 and 500 (supplied by Hansen & Rosenthal KG); and the series of Petrex, LPO-R, LPO-V, PF-1 and PF-2 (supplied by Yamabun-Yuka Co., Ltd.).

The examples of the carboxylic compounds include aliphatic carboxylic acids and aromatic carboxylic acids, and they can be either monocarboxylic acids or polycarboxylic acids.

The aliphatic carboxylic acids include, for example, saturated fatty acids, such as butanoic acid, pentanoic acid, hexanoic acid, heptanoic acid, octanoic acid, nonanoic acid, decanoic acid, dodecanoic acid, tetradecanoic acid, pentadecanoic acid, hexadecanoic acid, heptadecanoic acid, octadecanoic acid, nonadecanoic acid, icosanoic acid, docosanoic acid, tetradocosanoic acid, hexadocosanoic acid and octadocosanoic acid, and their (stereo)isomers; and unsaturated fatty acids such as crotonic acid, myristoleic acid, elaidic acid, gadoleic acid, erucic acid, 9-hexadecenoic acid, cis-9-octadecenoic acid, 11-octadecenoic acid, cis,cis-9,12-octadecadienoic acid, 9,12,15-octadecatrienoic acid, 6,9,12-octadecatrienoic acid, 9,11,13-octadecatrienoic acid, 8,11-icosadienoic acid, 5,8,11-icosatrienoic acid, 5,8,11,14-icosatetraenoic acid, and cis-15-tetradocosanoic acid.

The aromatic carboxylic acids include, for example, benzoic acid, (1- or 2-)naphtoic acid, phthalic acid, isophthalic acid, terephthalic acid, nicotinic acid, isonicotinic acid, (2- or 3-)furoic acid, cinnamic acid, anthranilic acid, hemimellitic acid, trimellitic acid, trimesic acid, mellophanic acid, prehnitic acid, piromellitic acid, mellitic acid, diphenic acid, xylic acid, hemellitic acid, mesitylene acid, mesitylene acid, prehnitylic acid, gamma-isodurylic acid, durylic acid, beta-isodurylic acid, alpha-isodurylic acid, cuminic acid, cumic acid, uvitic acid, hydratropic acid, atropic acid, hydrocynnamic acid, cinnamic acid, salicylic acid, anisic acid, creosotic acid, beta-resorcylic acid, gentisic acid, gamma-resorcylic acid, protocatechuic acid, alpha-resorcylic acid, vanillic acid, isovanillic acid, veratric acid, orsellinic acid, gallic acid, syringic acid, asaronic acid, mandelic acid, vanilmandelic acid, homoanisic acid, homoprotocatechuic acid, homovanillic acid, homoisovanillic acid, homoveratric acid, homophthalic acid, homoiophthalic acid, homoterephthalic acid, phthalonic acid, isophthalonic acid, terephthalonic acid, benzylic acid, atrolactic acid, tropic acid, melilotic acid, phloretic acid, hydrocaffeic acid, hydroferulic acid, hydroisoferulic acid, umbellic acid, caffeic acid, ferulic acid, isoferulic acid, sinapic acid, phthaloyl, isophthaloyl, terephthaloyl, toluoyl, xyloyl, cumoyl, hydratropoyl, atropoyl, hydrocinnamoyl, cinnamoyl, salicyloyl, anisoyl, creosotoyl, o-pyrocatechoyl, beta-resorcyloyl, gentisoyl, gamma-resorcyloyl, protocatechoyl, alpha-resorcyloyl, vanilloyl, isovanilloyl, o-veratroyl, veratroyl, galloyl, syringoyl, mandeloyl, vanilmandeloyl, homogentisoyl, homovanilloyl, homoveratroyl, benzyloyl, tropoyl, caffeoyl, feruloyl, perbenzoic acid, ibuprofen, ketoprofen, and felbinac.

The alcohol compounds can either be linear alcohols or branched alcohols, and can be either saturated or unsaturated alcohols.

The alcohol compounds are, for example, mono-ols such as 2-butanol, t-butanol, amyl alcohol, n-hexanol, cyclohexanol, 2-ethyl butanol, and n-octanol; polyhydric alcohols such as glycerin; alkoxyalcohols such as 3-methoxy-3-methyl butanol, 1-methoxyl-2-propanol, and 1-butoxyethoxypropanol; (poly)alkylene glycols such as ethylene glycol, diethylene glycol, propylene glycol, dipropylene glycol, polyethylene glycol, polypropylene glycol, and polyoxyethylene-polyoxypropylene glycol; and (poly)alkylene glycol monoethers such as ethylene glycol monomethyl ether, ethylene glycol monoethyl ether, ethylene glycol mono-n-propyl ether, ethylene glycol monoisopropyl ether, ethylene glycol mono-n-butyl ether, ethylene glycol mono-t-butyl ether, diethylene glycol monomethyl ether, diethylene glycol monoethyl ether, diethylene glycol mono-n-propyl ether, diethylene glycol monoisopropyl ether, diethylene glycol mono-n-butyl ether, triethylene glycol monomethyl ether, triethylene glycol monoethyl ether, triethylene glycol mono-n-propyl ether, triethylene glycol monoisopropyl ether, triethylene glycol mono-n-butyl ether, propylene glycol monoethyl ether, propylene glycol mono-n-propyl ether, propylene glycol mono-n-butyl ether, dipropylene glycol monomethyl ether, and dipropylene glycol monoethyl ether.

The ester compounds are those obtained by esterifying the carboxylic compounds with alcohols. The alcohols include $C_1$-$C_{18}$ aliphatic alcohols and $C_2$-$C_{10}$ glycols, and can also include the alcohol compounds mentioned above.

The ester compounds include, for example, aliphatic acid esters comprising an aliphatic monocarboxylic acid and alcohol, such as acetate ester, propionate ester, butyrate ester, and isovalerate ester; aliphatic esters comprising an aliphatic dicarboxylic acid and alcohol, such as adipate ester, succinate ester, and glutarate ester; aromatic acid esters comprising an aromatic monocarboxylic acid and alcohol such as benzoate ester; and aromatic acid esters comprising an aromatic dicarboxylic acid and alcohol such as phthalate ester and fumarate ester. The alcohols are $C_1$-$C_{18}$ aliphatic monohydric alcohols; alkylene glycols such as ethylene glycol and propylene glycol; and polyhydric alcohols such as glycerin, and they can either be linear or branched alcohols.

The ester compounds include monoesters, diesters, and triesters.

The gas migration inhibitor should preferably be nonpolar because the heat-expandable microspheres are produced in suspension polymerization. The nonporarity of the gas migration inhibitor is indicated by its solubility in water, and the solubility (of the gas migration inhibitor in water) should preferably be not greater than 20 g/liter, more preferably not greater than 10 g/liter, further more preferably not greater than 7 g/liter, and most preferably not greater than 5 g/liter.

The weight ratio of the gas migration inhibitor to the core material is not specifically restricted, and is preferably in the following ranges from 1) to 8), where a latter range is more preferable than a former one.

The ranges are 1) 1 to 80 weight percent, 2) 3 to 60 weight percent, 3) 5 to 50 weight percent, 4) 7 to 40 weight percent, 5) 10 to 30 weight percent, 6) 11 to 29 weight percent, 7) 12 to 25 weight percent, and 8) 15 to 20 weight percent.

The weight ratio of the gas migration inhibitor to the core material can also range from 1 weight percent to less than 30 weight percent.

A weight ratio of the gas migration inhibitor less than 1 weight percent of the core material can lead to poor heat resistance of the resultant heat-expandable microspheres and result in reduced thermal expanding performance of the microspheres after they undergo heat history before their thermal expansion. On the other hand, the weight ratio of the gas migration inhibitor greater than 80 weight percent of the core material can be more effective to hold the reduction of the thermal expansion ratio of the resultant heat-expandable microspheres when they undergo heat history before their thermal expansion. The high ratio, however, results in decreased weight ratio of a blowing agent in the core material, in other words, decreases the amount of the component contributing to thermal expansion of heat-expandable microspheres, so to reduce the inherent thermal expanding performance of heat-expandable microspheres.

The polymerizable component is polymerized in the presence of a polymerization initiator to be converted into thermoplastic resin which constitutes the shell of heat-expandable microspheres. The polymerizable component essentially comprises a monomer component and optionally contains a cross-linking agent.

The monomer component contains those usually referred to as (radically) polymerizable monomers having one polymerizable double bond, and includes, but not specifically restricted, for example, nitrile monomers, such as acrylonitrile, methacrylonitrile, alpha-chloroacrylonitrile, alpha-ethoxyacrylonitrile, and fumaronitrile; carboxyl-group-containing monomers, such as acrylic acid, methacrylic acid, itaconic acid, maleic acid, fumaric acid, and citraconic acid; vinylidene chloride; halogenated vinyl monomers, such as vinyl chloride, vinyl bromide, and vinyl fluoride; vinylester monomers, such as vinyl acetate, vinyl propionate, and vinyl butyrate; (meth)acrylate monomers, such as methyl(meth)acrylate, ethyl(meth)acrylate, n-butyl(meth)acrylate, isobutyl(meth)acrylate, t-butyl(meth)acrylate, propyl(meth)acrylate, n-octyl(meth)acrylate, dodecyl(meth)acrylate, 2-ethylhexyl(meth)acrylate, stearyl(meth)acrylate, 2-chloroethyl(meth)acrylate, phenyl(meth)acrylate, isobornyl(meth)acrylate, cyclohexyl(meth)acrylate, benzyl(meth)acrylate, beta-carboxyethyl acrylate, 2-hydroxyethyl(meth)acrylate, and 2-hydroxypropyl(meth)acrylate; styrene monomers, such as styrene, alpha-methyl styrene, and chlorostyrene; acrylamide monomers, such as acrylamide, substituted acrylamide, methacrylamide, and substituted methacrylamide; maleimide monomers, such as N-phenyl maleimide, N-(2-chlorophenyl)maleimide, N-cyclohexyl maleimide, and N-lauryl maleimide; styrene monomers, such as styrene, o-methyl styrene, m-methyl styrene, p-methyl styrene, p-ethyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, n-methoxystyrene, p-phenyl styrene, p-chlorostyrene, and 3,4-dichlorostyrene; ethylenically unsaturated monoolefin monomers, such as ethylene, propylene, butylene, and isobutylene; vinyl ether monomers, such as vinyl methyl ether, vinyl ethyl ether, and vinyl isobutyl ether; vinyl ketone monomers, such as vinyl methyl ketone, vinyl hexyl ketone, and methyl isopropenyl ketone; N-vinyl monomers, such as N-vinyl pyrrole, N-vinyl carbazole, N-vinyl indole, and N-vinyl pyrolidone; and vinylnaphthalene salts. Part of or all of the carboxyl groups in the carboxyl-group-containing monomers can be neutralized in the polymerization. The term, (meth)acryl, means acryl or methacryl. The maleimide monomers should preferably be N-substituted maleimide monomers having a substituent group bonded to its nitrogen atom.

One of or a combination of at least two of those radically polymerizable monomers can be used as a component constituting the polymerizable component. The polymerizable component should preferably contain at least one radically polymerizable monomer selected from the group consisting of nitrile monomers, (meth)acrylate monomers, carboxyl-group-containing monomers, styrene monomers, vinyl acetate, (meth)acrylamide monomers, maleimide monomers, and vinylidene chloride.

A polymerizable component essentially comprising nitrile monomers is preferable because such component attains improved heat resistance and solvent resistance of thermoplastic resin constituting the shell of heat-expandable microspheres.

A polymerizable component comprising vinylidene chloride and/or a (meth)acrylate monomer in addition to a nitrile monomer is further preferable. A polymerizable component containing vinylidene chloride improves gas-barrier property of the resultant heat-expandable microspheres. A polymerizable component containing a (meth)acrylate monomer contributes to easily controllable expanding behavior of the resultant heat-expandable microspheres.

A polymerizable component, which further comprises a carboxyl-group-containing monomer, in addition to a nitrile monomer, is preferable, because such component improves the heat resistance and solvent resistance of the resultant thermoplastic resin and increases the glass-transition temperature of the thermoplastic resin so as to make the resultant heat-expandable microspheres expandable at high temperature. The polymerizable component can further contain vinylidene chloride and/or a (meth)acrylate monomer in addition to the nitrile monomer and carboxyl-group-containing monomer.

The polymerizable component mentioned above preferably further contain a maleimide monomer, because such component minimizes the coloring of the resultant heat-expandable microspheres.

Then ratio of each of the radically polymerizable monomers constituting the polymerizable component is not specifically restricted, and is preferably in the following ranges from (A) to (F).

(A) Polymerizable Component Essentially Containing Vinylidene Chloride

The weight ratio of vinylidene chloride is preferably at least 10 weight percent, more preferably at least 20 weight percent, further more preferably at least 30 weight percent, and most preferably at least 40 weight percent of the monomer component.

(B) Polymerizable Component Essentially Containing a Nitrile Monomer and (Meth)Acrylate Monomer in Addition to Vinylidene Chloride The weight ratio of vinylidene chloride preferably ranges from 90 to 9 weight percent, more preferably from 85 to 13 weight percent, further more preferably from 80 to 15 weight percent, yet more preferably from 75 to 20 weight percent, and most preferably from 70 to 30 weight percent of the monomer component. The weight ratio of the nitrile monomer preferably ranges from 9 to 90 weight percent, more preferably from 13 to 85 weight percent, further more preferably from 15 to 80 weight percent, yet more preferably from 20 to 70 weight percent, and most preferably from 25 to 60 weight percent of the monomer component. The weight ratio of the (meth)acrylate monomer preferably ranges from 1 to 20 weight percent, more preferably from 2 to 19 weight percent, further more preferably from 3 to 18 weight percent, yet more preferably from 4 to 16 weight percent, and most preferably from 5 to 15 weight percent of the monomer component.

(C) Polymerizable Component Essentially Containing a Nitrile Monomer and (Meth)Acrylate Monomer The weight ratio of the nitrile monomer preferably ranges from 30 to 99 weight percent, more preferably from 35 to 98 weight percent, further more preferably from 40 to 97 weight percent, yet more preferably from 45 to 96 weight percent, and most preferably from 50 to 95 weight percent of the monomer component. The weight ratio of the (meth)acrylate monomer preferably ranges from 70 to 1 weight percent, more preferably from 65 to 1.5 weight percent, further more preferably from 60 to 2 weight percent, yet more preferably from 55 to 2.5 weight percent, and most preferably from 50 to 3 weight percent of the monomer component.

(D) Polymerizable Component Essentially Containing a Maleimide Monomer

The weight ratio of the maleimide monomer preferably ranges from 0.1 to 60 weight percent, more preferably from 0.3 to 55 weight percent, further more preferably from 0.5 to 50 weight percent, and most preferably from 1 to 45 weight percent of the monomer component.

(E) Polymerizable Component Essentially Containing a Carboxyl-Group-Containing Monomer The weight ratio of the carboxyl-group-containing monomer is preferably at least 5 weight percent, more preferably at least 10 weight percent, further more preferably at least 15 weight percent, and most preferably at least 20 weight percent of the monomer component.

(F) Polymerizable Component Essentially Containing a Carboxyl-Group-Containing Monomer in Addition to Nitrile Monomer The weight ratio of the nitrile monomer preferably ranges from 20 to 95 weight percent, more preferably from 25 to 90 weight percent, further more preferably from 30 to 85 weight percent, yet more preferably from 35 to 80 weight percent, and most preferably from 40 to 70 weight percent of the monomer component. The weight ratio of the carboxyl-group-containing monomer preferably ranges from 4 to 80 weight percent, more preferably from 9 to 70 weight percent, further more preferably from 13 to 60 weight percent, yet more preferably from 18 to 55 weight percent, and most preferably from 25 to 50 weight percent of the monomer component.

A monomer component essentially containing a carboxyl-group-containing monomer (i.e., the polymerizable components of (E) and (F) mentioned above) can contain another monomer reactive to the carboxyl groups in the carboxyl-group-containing monomer in addition to the carboxyl-group-containing monomer. A monomer component containing a carboxyl-group-containing monomer and a monomer reactive to the carboxyl groups in the carboxyl-group-containing monomer contributes to improved heat resistance of the resultant heat-expandable microspheres and improves their thermal expanding performance at high temperature.

The monomer reactive to the carboxyl groups in a carboxyl-group-containing monomer includes, for example, N-methylol(meth)acrylamide, N,N-dimethylaminoethyl (meth)acrylate, N,N-dimethylaminopropyl(meth)acrylate, magnesium mono(meth)acrylate, zinc mono(meth)acrylate, vinyl glycidyl ether, propenyl glycidyl ether, glycidyl(meth) acrylate, 2-hydroxyethyl(meth)acrylate, 2-hydroxypropyl (meth)acrylate, 2-hydroxybutyl(meth)acrylate, and 2-hydroxy-3-phenoxypropyl(meth)acrylate. The weight ratio of the monomer reactive to the carboxyl groups in a carboxyl-group-containing monomer preferably ranges from 0.1 to 10 weight percent, more preferably from 1 to 8 weight percent, further more preferably from 1.5 to 7 weight percent, yet more preferably from 2 to 6 weight percent, and most preferably from 3 to 5 weight percent of the monomer component.

A monomer component which comprises a monomer having halogen, oxygen, or nitrogen effectively prevents the agglomeration of heat-expandable microspheres generated in polymerization and the generation of scale in a polymerization reactor.

The polymerizable component can contain a polymerizable monomer having at least two polymerizable double bonds (a cross-linking agent), in addition to the monomer components mentioned above. Polymerization of the polymerizable component with a cross-linking agent minimizes the loss of the retention (retention in microspheres) of a blowing agent in thermally expanded microspheres so to optimize the efficiency of thermal expansion of the microspheres.

The cross-linking agent is not specifically restricted, and includes, for example, aromatic divinyl compounds, such as divinyl benzene and divinyl naphthalene; and di(meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, neopentylglycol di(meth)acrylate, 1,6-hexanediol di(meth)acrylate, trimethylolpropane trimethacrylate, glycerin dimethacrylate, dimethyloltricyclodecane diacrylate, pentaerythritol tri(meth)acrylate, pentaerythritol tetraacrylate, dipentaerythritol hexaacrylate, neopentylglycol acrylic acid benzoate, trimethylolpropane acrylic acid benzoate, 2-hydroxy-3-acryloyloxypropyl methacrylate, hydroxypivalic acid neopentylglycol diacrylate, ditrimethylolpropane tetraacrylate, and 2-butyl-2-ethyl-1,3-propanediol diacrylate. One of or a combination of at least two of those cross-linking agents can be used. In the above description, the series of the compounds described as "PEG (XXX)di(meth)acrylate" are polyethylene glycol di(meth)acrylates, wherein the average molecular weight of their polyethylene glycol moieties is represented by the number XXX in the parentheses.

The cross-linking agent is not an essential component, and its amount is not specifically restricted but should preferably be, to 100 parts by weight of a monomer component, in the following ranges from 1) to 6), the order of which indicates the preference where a latter range is more preferable than a former one, considering the degree of cross-linking, the retention of a blowing agent encapsulated in the shell of the resultant microspheres, and heat resistance and thermal expanding performance of the resultant microspheres.

The ranges are 1) 0.01 to 5 parts by weight, 2) 0.03 to 3 parts by weight, 3) 0.05 to 2.5 parts by weight, 4) 0.1 to 2 parts by weight, 5) 0.3 to 1.5 parts by weight, and 6) 0.4 to 1 parts by weight.

In the production method of the present invention, it is preferable to polymerize the polymerizable component in the presence of a polymerization initiator.

The polymerization initiator is not specifically restricted, and includes, for example, peroxides, such as peroxydicarbonate, peroxyester, and diacyl peroxide; and azo compounds. One of or a combination of at least two of the polymerization initiators can be employed. A preferable polymerization initiator is an oil-soluble polymerization initiator which is soluble in a radically polymerizable monomer.

Among those polymerization initiators, peroxydicarbonates are preferable, because they control the generation of resin particles inside the shell of heat-expandable microspheres, make the shell less apt to become thinner than its theoretical value, and increase the expansion ratio of the resultant heat-expandable microspheres. Considering the availability of peroxydicarbonates, the (co)polymerizability of a polymerizable component, and the effect by the peroxydicarbonates such as the randomization of the structure of thermoplastic resin constituting the shell of microspheres, a more preferable peroxydicarbonate is at least one selected from the group consisting of diisopropyl peroxydicarbonate, bis(4-t-butylcyclohexyl)peroxydicarbonate, di-sec-butyl peroxydicarbonate, and di(2-ethylhexyl)peroxydicarbonate, and a further more preferable peroxydicarbonate is at least one selected from the group consisting of di-sec-butyl peroxydicarbonate and di(2-ethylhexyl)peroxydicarbonate.

The amount of the polymerization initiators is not specifically restricted, and should preferably range from 0.3 to 8 parts by weight, more preferably from 0.4 to 7.5 parts by weight, further preferably from 0.5 to 7.7 parts by weight, further more preferably from 0.5 to 7 parts by weight, and most preferably from 0.8 to 7 parts by weight to 100 parts by weight of the monomer component.

For a polymerization initiator containing another polymerization initiator in addition to a peroxydicarbonate, higher ratio of the peroxydicarbonate in the polymerization initiator results in higher effect in polymerization. The ratio of the peroxydicarbonate in a polymerization initiator should preferably be at least 60 weight percent, more preferably at least 70 weight percent, further preferably at least 80 weight percent, yet more preferably at least 90 weight percent, and most preferably 100 weight percent.

In the production method of the present invention, a chain transfer agent, organic pigment, and inorganic pigment or particles having hydrophobized surface can be further employed.

In the present invention, the aqueous dispersion medium mainly comprises deionized water to disperse an oily mixture comprising a polymerizable component and a blowing agent, and can further contain a hydrophilic organic solvent, such as alcohols. The amount of the aqueous dispersion medium is not specifically restricted, and preferably ranges from 100 to 1000 parts by weight to 100 parts by weight of a polymerizable component.

The aqueous dispersion medium can further contain an electrolyte. The electrolyte is not specifically restricted, and includes, for example, lithium chloride, sodium chloride, potassium chloride, magnesium chloride, calcium chloride, sodium carbohydrate, lithium sulfate, sodium sulfate, potassium sulfate, magnesium sulfate, ammonium sulfate, sodium carbonate, and benzoic acid. One of or a combination of at least two of those electrolytes can be used. The amount of the electrolyte in an aqueous dispersion medium is not specifically restricted, and should preferably range from 0.1 to 50 parts by weight to 100 parts by weight of an aqueous dispersion medium.

The aqueous dispersion medium can further contain a polymerization auxiliary which prevents the agglomeration of heat-expandable microspheres generated in polymerization and contributes to the production of heat-expandable microspheres to be expanded into hollow microspheres resistant to repeated compression. The polymerization auxiliary includes alkali metal nitrites, such as sodium nitrite and potassium nitrite; stannous chloride, stannic chloride, ferrous chloride, ferric chloride, ferrous sulfate, water-soluble ascorbic acid, its derivatives, and water-soluble 1-1-substituted compounds. Among those auxiliaries, alkali metal nitrites and water-soluble 1-1-substituted compounds are preferable. The amount of the polymerization auxiliary in the aqueous dispersion medium ranges from 0.0001 to 1 parts by weight, more preferably from 0.0003 to 0.1 parts by weight to 100 parts by weight of the monomer component.

The water-soluble 1,1-substituted compounds have a bond at which a carbon atom is bonded with a hetero atom and a hydrophilic functional group selected from the group consisting of hydroxyl group, carboxylic acid (salt) groups, and phosphonic acid (salt) groups.

The term, carboxylic acid (salt) groups, mean carboxylic acid group or carboxylate groups. Carboxylic acid group is a carboxyl group (—COOH), and carboxylate groups are those formed by substituting the proton of a carboxyl group with a metal atom, primary amine group, secondary amine group, tertiary amine group, quaternary amine group, or ammonium group (—$NH_4^+$). The term, phosphonic acid (salt) groups, mean phosphonic acid group or phosphonate groups. Phosphonic acid group is —$PO_3H_2$, and phosphonate groups are those formed by substituting at least one proton of a phosphonic acid group with a metal atom, primary amine group, secondary amine group, tertiary amine group, quaternary amine group, or ammonium group (—$NH_4^+$).

The water-soluble 1,1-substituted compounds are not specifically restricted, and include, for example, an aminopolycarboxylic acid (salt) formed of a carboxylic acid (salt) group as a hydrophilic functional group and of a nitrogen atom as a hetero atom; and an aminopolyphosphonic acid (salt) formed of a phosphonic acid (salt) group as a hydrophilic functional group and of a nitrogen atom as a hetero atom.

The aminopolycarboxylic acid (salt) is not specifically restricted, and includes, for example, aminopolycarboxylic acids such as ethylenediaminetetraacetic acid (including its salt), hydroxyethylethylenediaminetriacetic acid (including its salt), diethylenetriaminepentaacetic acid (including its salt), dihydroxyethylethylenediaminediacetic acid (including its salt), 1,3-propanediaminetetraacetic acid (including its salt), diethylenetriaminepentaacetic acid (including its salt), triethylenetetraaminehexaacetic acid (including its salt), nitrilotriacetic acid (including its salt), gluconic acid (including its salt), hydroxyethyliminodiacetic acid (including its salt), L-aspartate-N,N-diacetic acid (including its salt), dicarboxymethyl glutamic acid (including its salt), 1,3-diamino-2-hydroxypropanetetraacetic acid (including its salt), and dihydroxyethyl glycine (including its salt); their metal salts; and their ammonium salts. One of or a combination of at least two of these aminopolycarboxylic acids (salts) can be used.

The aminopolyphosphonic acid (salt) is not specifically restricted, and includes, for example, aminopolyphosphonic acids, such as aminotrimethylenephosphonic acid (and its salt), hydroxyethanephosphonic acid (and its salt), hydroxyethylidenediphosphonic acid (and its salt), dihydroxyethyl glycine (and its salt), phosphonobutanetriacetic acid (and its salt), methylenephosphonic acid (and its salt), nitrilotris (methylenephosphonic acid) (and its salt), and ethylenediaminetetrakis (methylenephosphonic acid) (and its salt); their metal salts; and their ammonium salts. One of or a combination of at least two of these aminopolyphosphonic acids (salts) can be used.

The aminopolycarboxylic acid salts and aminopolyphosphonic acid salts mentioned above mean the metal salts, amine salts, and ammonium salts of aminopolycarboxylic acids and aminopolyphosphonic acids.

The metal salts mentioned above are the compounds in which at least one proton of their acid groups, such as carboxylic acid group and phosphonic acid group, is substituted with a metal atom. The metal atom includes, for example, alkali metals, such as lithium, sodium, and potassium (Group I metals in the periodic table); alkaline earth metals, such as beryllium, magnesium, calcium, strontium, and barium (Group II metals in the periodic table); and transition metals, such as iron, cupper, manganese, zinc, and cobalt. Among those metal atoms, sodium and potassium are preferable.

The amine salts mentioned above are the compounds in which at least one proton of their acid groups, such as carboxylic acid group and phosphonic acid group, reacts with an amine. The amine salts are also explained as the compounds in which at least one proton of their acid groups, such as carboxylic acid group and phosphonic acid group, is substituted with a primary, secondary, tertiary or quaternary amine group.

Other water-soluble 1,1-substituted compounds are not specifically restricted, and include, for example, a compound containing a carboxylic acid (salt) group as the hydrophilic functional group and a nitrogen atom as the hetero atom, such as 2-carboxypyridine, orotic acid, quinolinic acid, lutidinic acid, isocinchomeronic acid, dipicolinic acid, berberonic acid, fusaric acid, and orotic acid; a compound containing a hydroxyl(salt) group as the hydrophilic functional group and a nitrogen atom as the hetero atom, such as 2-hydroxypyridine, 6-hydroxynicotine acid, and citrazinic acid; and a compound containing a carboxylic acid (salt) group as the hydrophilic functional group and a sulfur atom as the hetero atom, such as thiodiglycolic acid.

Preferable water-soluble 1,1-substituted compounds are those containing a carboxylic acid (salt) group and/or phosphonic acid (salt) group as the hydrophilic functional group, and a nitrogen atom and/or sulfur atom as the heteroatom.

The aqueous dispersion medium can further contain a dispersion stabilizer and dispersion stabilizing auxiliary.

The dispersion stabilizer is not specifically restricted, and includes, for example, colloidal silica, colloidal calcium carbonate, magnesium hydroxide, calcium hydroxide, aluminum hydroxide, ferric hydroxide, calcium sulfate, barium sulfate, calcium oxalate, calcium methasilicate, calcium carbonate, barium carbonate, magnesium carbonate; phosphate salts such as calcium phosphate, magnesium phosphate, aluminum phosphate, and zinc phosphate; pyrophosphate salts such as calcium pyrophosphate, aluminum pyrophosphate, and zinc pyrophosphate, and poorly water-soluble inorganic compounds such as alumina sol. One of or a combination of at least two of those dispersion stabilizers can be used, and their variants are selected according to the intended particle size of the resultant heat-expandable microspheres and the stability of the dispersion in polymerization. Above all, calcium triphosphate, pyrophosphates obtained in metathesis reaction such as magnesium pyrophosphate and calcium pyrophosphate, and colloidal silica are preferable.

The amount of the dispersion stabilizer is properly determined according to a target particle size of heat-expandable microspheres and is not specifically restricted. The amount should preferably range from 0.1 to 20 parts by weight, more preferably from 2 to 10 parts by weight, to 100 parts by weight of a polymerizable component.

The dispersion stabilizing auxiliary is not specifically restricted, and includes, for example, polymer type dispersion stabilizing auxiliaries; and surfactants, such as cationic surfactants, anionic surfactants, amphoteric surfactants, and nonionic surfactants. One of or a combination of at least two of the dispersion stabilizing auxiliaries can be employed, and they are selected according to the particle size of the resultant heat-expandable microspheres and the stability of the dispersion in polymerization.

The polymer type dispersion stabilizing auxiliaries include, for example, a condensate of diethanolamine and an aliphatic dicarboxylic acid, gelatin, polyvinylpyrolidone, methyl cellulose, polyethylene oxide, and polyvinyl alcohol.

The amount of the dispersion stabilizing auxiliaries is not specifically restricted, and should preferably range from 0.0001 to 5 parts by weight, more preferably from 0.0003 to 2 parts by weight, to 100 parts by weight of a polymerizable component.

The aqueous dispersion medium is prepared by blending an electrolyte, a polymerizing auxiliary, a dispersion stabilizer, and a dispersion stabilizing auxiliary with water, such as deionized water. The pH of the aqueous dispersion medium for polymerization is properly defined. The aqueous dispersion medium for polymerization can either be acidic, neutral, or alkaline, and should preferably be acidic or neutral, more preferably acidic. The pH of the aqueous dispersion medium for polymerization should normally range from 2 to 13, preferably from 2 to 10, more preferably from 2 to 8, further preferably from 2 to 6.5, yet more preferably from 2 to 6, and most preferably from 2 to 4.

In the production method of the present invention, a polymerizable component essentially containing a monomer component and optionally containing a cross-linking agent, a blowing agent, a polymerization initiator, an aqueous dispersion medium essentially containing water, an electrolyte, a polymerization auxiliary such as a water-soluble additive, a dispersion stabilizer, and a dispersion stabilizing auxiliary mentioned above are mixed, and the polymerizable component is polymerized. The order for mixing these components is not specifically restricted, and the components soluble or dispersible in the aqueous dispersion medium can be mixed in the medium before they are mixed with other components.

In the present invention, an oily mixture of a polymerizable component, blowing agent, etc. is dispersed and emulsified in an aqueous dispersion medium so as to form oil globules of an intended particle size.

The methods for dispersing and emulsifying the oily mixture include generally known dispersion techniques, such as agitation with a Homo-mixer or Homo-disper (for example, those manufactured by Tokushu Kika Kogyou), dispersion with a static dispersing apparatus such as a Static mixer (for example, those manufactured by Noritake Engineering Co., Ltd.), membrane emulsification technique, ultrasonic dispersion, and microchannel emulsification.

Then the suspension polymerization is started by heating the dispersion in which the oily mixture is dispersed into oil globules in the aqueous dispersion medium. It is preferable to agitate the dispersion during the polymerization reaction, and the agitation should be performed gently to a degree which prevents the floating of monomers and sedimentation of polymerized heat-expandable microspheres.

The polymerization temperature can be freely settled according to the variant of a polymerization initiator, and should preferably be controlled within the range from 30 to 100 deg.C., more preferably from 40 to 90 deg.C., and further more preferably from 50 to 85 deg.C. The reaction temperature should preferably be maintained for about 0.1 to 20 hours. The initial pressure for the polymerization is not specifically restricted, and should preferably be controlled within the range from 0 to 5.0 MPa, more preferably from 0.1 to 3.0 MPa, and further more preferably from 0.2 to 2.0 MPa in gauge pressure.

After the polymerization reaction is completed, the dispersion stabilizer can be optionally decomposed with hydrochloric acid and the like, and the resultant product (heat-expandable microspheres) is separated from the dispersion with some operation, such as suction filtration, centrifugal separation, or centrifugal filtration. Further the resultant wet cake of heat-expandable microspheres is washed with water and dried to obtain heat-expandable microspheres.

The polymerization in the production method of the present invention is preferably carried out substantially in the absence of ferromagnetic substances. Heat-expandable microspheres produced in the polymerization in the presence of ferromagnetic substances have ferromagnetic property which considerably restricts the application of the microspheres. In addition, ferromagnetic substances, which are usually colored dark or gray, can stain polymerization tanks or migrate into thermoplastic resin forming the shell of heat-expandable microspheres or into the core material encapsulated in the microspheres. The ferromagnetic substances contained in the resultant heat-expandable microspheres can color the microspheres into dark or gray, and inhibit their application to white or light-colored compositions. Therefore, the polymerization in the presence of ferromagnetic substances is not advantageous.

A polymerization condition substantially in the absence of ferromagnetic substances means that the amount of ferromagnetic substances in the polymerization mixture is not higher than 5 weight percent of the core material, preferably not higher than 3 weight percent, more preferably not higher than 1 weight percent, further more preferably not higher than 0.1 weight percent, and most preferably 0 weight percent.

The ferromagnetic substances are, for example, water-soluble salts (for example, chlorides and sulfates) of metals such as ferrous iron, ferric iron, zinc, manganese, nickel, cobalt, calcium and cupper; and oxides of those metals.

The oxides mentioned above include ferrite and magnetite, and examples of those are $[FeO]_{1-n} \cdot [Fe_2O_3]_n$, $[FeO]_{1-n \cdot [ZnO]n} \cdot Fe_2O_3$, $[MnO]_{1-n} \cdot [ZnO]_n \cdot Fe_2O_3$, $[NiO]_{1-n} \cdot [ZnO]_n \cdot Fe_2O_3$, and $[CoO]_{1-n} \cdot [FeO]_n \cdot Fe_2O_3$.

The process for producing heat-expandable microspheres of the present invention can further contain the step of adhering a particulate filler on the outer surface of the shell of the microspheres. A particulate filler adhered onto the outer surface of the shell of the microspheres contributes to improved dispersibility and flowability of the microspheres in use.

The particulate filler can be either an organic or an inorganic filler, and the variant and amount of the particulate filler are selected according to the application of the microspheres.

The organic particulate filler includes, for example, metal soaps such as magnesium stearate, calcium stearate, zinc stearate, barium stearate, and lithium stearate; synthetic waxes, such as polyethylene wax, lauric acid amide, myristic acid amide, palmitic acid amide, stearic acid amide, and hydrogenated castor oil; and resin powders, such as polyacrylamide, polyimide, nylon, poly(methyl methacrylate), polyethylene, and polytetrafluoroethylene.

The examples of inorganic particulate fillers are those having a layered structure, such as talc, mica, bentonite, sericite, carbon black, molybdenum disulfide, tungsten disulfide, carbon fluoride, calcium fluoride, and boron nitride; and others, such as silica, alumina, isinglass, calcium carbonate, calcium hydroxide, calcium phosphate, magnesium hydroxide, magnesium phosphate, barium sulfate, titanium dioxide, zinc oxide, ceramic beads, glass beads, and crystal beads.

One of or a combination of at least two of the particulate fillers can be employed.

The average particle size of the particulate fillers is preferably not greater than one tenth of the average particle size of heat-expandable microspheres before adhering the particulate fillers. The average particle size of the particulate filler mentioned here means the average particle size of the primary particles of the particulate filler.

The amount of a particulate filler adhered onto heat-expandable microspheres is not specifically restricted, and should preferably range from 0.1 to 95 parts by weight, more preferably from 0.5 to 60 parts by weight, further more preferably from 5 to 50 parts by weight, and most preferably from 8 to 30 parts by weight to 100 parts by weight of heat-expandable microspheres before adhering the filler, considering the true specific gravity of heat-expandable microspheres and for optimizing the function of the particulate filler.

A particulate filler can be adhered onto heat-expandable microspheres by mixing heat-expandable microspheres and the particulate filler. The mixing process is not specifically restricted, and a device with very simple equipment, such as a vessel and paddle blades, is employable. Ordinary powder mixers for shaking or agitating powders are also applicable.

The powder mixers include those which can shake and agitate, or agitate powders, such as ribbon-type mixers and vertical screw mixers. Highly efficient multi-functional powder mixers recently manufactured by combining several agitation devices, such as Super Mixer (manufactured by Kawata MFG Co., Ltd.), High-Speed Mixer (manufactured by Fukae Co., Ltd.), New-Gram Machine (manufactured by Seishin Enterprise Co., Ltd.), and SV mixer (manufactured by KOBELCO Eco-Solutions Co., Ltd.), can be used.

[Heat-Expandable Microspheres and their Application]

The heat-expandable microspheres of the present invention, as shown in FIG. 1, have a core-shell structure which comprises a shell of thermoplastic resin 1 and core material (core) 2 encapsulated in the shell. Each of the heat-expandable microspheres exhibits thermal expanding performance in whole (expansion of whole of a heat-expandable microsphere under heating).

The core material essentially contains a blowing agent having a boiling point not higher than the softening point of the thermoplastic resin, and preferably contains a gas migration inhibitor having a boiling point higher than the softening point of the thermoplastic resin in addition to the blowing agent.

The thermoplastic resin, polymerizable component to be polymerized into the thermoplastic resin, the blowing agent and gas migration inhibitor constituting the core material, and their ratio (for example, the weight ratio of the gas migration inhibitor to the core material) for the heat-expandable microspheres of the present invention have been explained in detail in the description for the production method mentioned above.

The average particle size of the heat-expandable microspheres can be freely designed according to their application, and therefore is not specifically restricted. The average particle size normally ranges from 1 to 100 micrometer, preferably from 2 to 80 micrometer, more preferably from 3 to 60 micrometer, and further more preferably from 5 to 50 micrometer.

The coefficient of variation, CV, of the particle size distribution of the heat-expandable microspheres is not specifically restricted, and is preferably up to 35 percent, more preferably up to 30 percent, and further more preferably up to 25 percent. The coefficient of variation, CV, is calculated by the following expressions (1) and (2):

[Expression 1]

$$CV = (S/\langle x \rangle) \times 100 \text{ (percent)} \quad (1)$$

$$s = \left\{ \sum_{i=1}^{n} (xi - \langle x \rangle)^2 / (n-1) \right\}^{1/2} \quad (2)$$

where S is a standard deviation of particle size, $\langle x \rangle$ is an average particle size, xi is a particle size of the i-th largest microsphere, and n is the number of microspheres.

In the case that the expansion-initiating temperature of the heat-expandable microspheres of the present invention is represented by Ts (deg.C.), the maximum expansion ratio of the heat-expandable microspheres is represented by A (times), and the maximum expansion ratio of the heat-expandable microspheres after heating at a temperature, T (deg.C.) being in the range of (Ts−15)≦T<Ts, for 10 minutes and cooling down to room temperature is represented by B (times), the ratio of B to A, i.e., B/A, should be at least 0.7, preferably at least 0.80, more preferably at least 0.85, further more preferably at least 0.90, and most preferably at least 0.95. A value of B/A lower than 0.7 implies that the expansion ratio of the microspheres has been reduced due to gas migration from the microspheres in the heating and such microspheres will not sufficiently lighten the final products. The room temperature mentioned here ranges from 15 to 30 deg.C.

If the true specific gravity of the heat-expandable microspheres after the heating mentioned above is represented by "d", and to the true specific gravity of the heat-expandable microspheres before the heating is represented by "$d_0$", the ratio of d to $d_0$, or $d/d_0$, should preferably range from 0.5 to 1.3, more preferably from 0.6 to 1.2, and further more preferably from 0.8 to 1.1. A value of $d/d_0$ greater than 1.3 results in gas migration from the heat-expandable microspheres, in other words, the migration of the blowing agent from the core material encapsulated in the heat-expandable microspheres through the shell of thermoplastic resin, and causes the reduction of the expansion ratio of the heat-expandable microspheres. On the other hand, a value of $d/d_0$ lower than 0.5 implies that the heat-expandable microspheres have already started expansion and their potential expansion ratio at higher temperature has been decreased.

Heat-expandable microspheres should preferably have the following properties.

The amount of core material encapsulated in heat-expandable microspheres is designed freely according to their application and is not specifically restricted. The amount should preferably range from 2 to 60 weight percent, more preferably from 5 to 50 weight percent, and further more preferably from 8 to 45 weight percent to the weight of heat-expandable microspheres.

The maximum-expansion temperature of heat-expandable microspheres is not specifically restricted, and selected according to their end use. The preferable maximum-expansion temperature should be within the following ranges from 1) to 6) where a latter range is more preferable than a former one.

The ranges are 1) 120 to 240 deg.C., 2) 150 to 230 deg.C., 3) 160 to 225 deg.C., 4) 170 to 220 deg.C., 5) 180 to 215 deg.C., and 6) 190 to 210 deg.C.

Heat-expandable microspheres having a maximum expansion temperature below 120 deg.C. can cause some difficulty in storing at normal temperature. On the other hand, heat-expandable microspheres having a maximum expansion temperature higher than 240 deg.C. can result in insufficient expansion ratio.

The true specific gravity of hollow microspheres prepared by expanding heat-expandable microspheres under maximum expansion condition ($d_{max}$, minimum true specific gravity at maximum expansion) is not specifically restricted, and is preferably in the following ranges of 1) to 7) where a latter range is more preferable than a former one.

The ranges are 1) 0.002 to 0.035 g/cc, 2) 0.003 to 0.03 g/cc, 3) 0.005 to 0.025 g/cc, 4) 0.007 to 0.024 g/cc, 5) 0.01 to 0.023 g/cc, 6) 0.013 to 0.02 g/cc, and 7) 0.013 to 0.02 g/cc.

The expansion ratio of heat-expandable microspheres at their maximum expansion, $d_0/d_{max}$ (times), which is calculated from the true specific gravity of the heat-expandable microspheres ($d_0$) before the heating mentioned above and the minimum true specific gravity of the heat-expandable microspheres ($d_{max}$) at their maximum expansion, is preferably in the following ranges of 1) to 6) where a latter range is more preferable than a former one.

The ranges are 1) 15 times or more, 2) 20 times or more, 3) 25 times or more, 4) 30 times or more, 5) 40 times or more, and 6) 50 times or more.

If the expansion ratio of heat-expandable microspheres at their maximum expansion ($d_0/d_{max}$) is lower than 15 times, the microspheres have not been sufficiently expanded, and such microspheres can only be employed under limited conditions for limited end uses.

It is preferable that the heat-expandable microspheres do not substantially contain a ferromagnetic substance as explained in detail in the production method mentioned above. The heat-expandable microspheres which do not substantially contain a ferromagnetic substance are those containing a ferromagnetic substance in an amount of 5 weight percent or less, preferably 3 weight percent or less, more preferably 1 weight percent or less, further more preferably 0.1 weight percent or less, and most preferably 0 weight percent, of the core material weight.

The heat-expandable microspheres should preferably further comprise a particulate filler being adhered on the outer surface of the shell of the microspheres.

Thermally expanded microspheres (hollow microspheres) are manufactured by thermally expanding the heat-expandable microspheres of the present invention and/or the heat-expandable microspheres produced in the method of the present invention. The process for producing the hollow microspheres is not specifically restricted and can include dry thermal expansion methods and wet thermal expansion methods.

An example of the dry thermal expansion methods is the internal jetting method described in JP A 2006-213930 (having an English language counterpart U.S. Patent Application Publication No. 2007/0154711). The internal jetting method is a dry thermal expansion method, which comprises the steps of feeding a gas fluid containing heat-expandable microspheres through a gas-introducing tube having a dispersion nozzle on its outlet and being fixed in a hot gas flow, and then jetting the gas fluid from the dispersion nozzle (jetting step); making the gas fluid collide on a collision plate fixed opposite to the dispersion nozzle so as to disperse the heat-expandable microspheres in the hot gas flow (dispersing step); and heating the dispersed heat-expandable microspheres in the hot gas flow at a temperature not lower than their expansion-initiating temperature so as to expand the heat-expandable microspheres (expanding step). The internal jetting method is preferable because it produces hollow microspheres of uniform property regardless of the variants of thermoplastic resin forming the shell of the heat-expandable microspheres, the source material.

Another dry thermal expanding method is described in JP A 2006-96963, and a wet thermal expanding method is described in JP A 62-201231.

The average particle size of the hollow microspheres can be freely designed according to their application, and therefore is not specifically restricted. The average particle size should preferably range from 1 to 1000 micrometer, more preferably from 5 to 800 micrometer, and further more preferably from 10 to 500 micrometer. The coefficient of variation, CV, of the particle size distribution of the hollow microspheres is not specifically restricted, and should preferably be 30 percent or less, more preferably 27 percent or less, and further more preferably 25 percent or less.

The repeated-compression durability of the hollow microspheres obtained by thermally expanding heat-expandable microspheres is not specifically restricted, and is preferably not lower than 60 percent, more preferably not lower than 65 percent, and further more preferably not lower than 70 percent. Hollow microspheres having a repeated-compression durability lower than 60 percent can have poor compression durability with insufficiently lowered specific gravity. The upper limit of the repeated-compression durability of hollow microspheres is 100%.

The composition of the present invention comprises a base component except diene rubbers and heat-expandable microspheres and/or hollow microspheres.

The base component except diene rubbers is not specifically restricted and includes, for example, polymerized resins such as unsaturated polymerized resins and ring-opened polymerized resins; condensation resins such as addition-condensation resins, condensation-polymerization resins, and addition-polymerization resins; semi-synthesized polymers such as cellulose resins and protein resins; and inorganic materials such as cements and ceramics. One of or a combination of at least two of those materials can be employed as the base component.

The unsaturated polymer resins include, for example, hydrocarbon resins such as polyethylene, ethylene copolymers (ethylene-vinyl acetate copolymer, etc.), polypropylene, ethylene-propylene rubber, polybutene, polyisobutylene, 4-methyl pentene-1 resin, piperine resin, petroleum resin, styrol resin, coumarone-indene resin, and terpene resin; reactive (meth)acrylate resins such as (meth)acrylate resin and glycidyl methacrylate; acrylic acid resins such as polyacrylonitrile, polycyanoacrylate, polyacrylamide, (meth) acrylic acid resin, and their salts; vinyl acetate or vinyl alcohol resins such as vinyl acetate resin, polyvinyl alcohol, polyvinyl acetal resin, and polyvinyl ether; halogen-containing resins such as vinyl chloride resin, vinyl chloride-vinyl acetate copolymer, vinylidene chloride resin, and fluorine resin; and nitrogen-containing vinyl copolymers such as polyvinyl carbazole, polyvinyl pyrolidone, polyvinyl pyridine, and polyvinyl imidazole.

The ring-opened polymerized resins include, for example, polyethers such as polyoxymethylene, polyethylene oxide, polyethylene glycol, polypropylene oxide, polypropylene glycol, Hydrin rubber, tricyclic oxide polymers, and penton resin; and polyethyleneimines.

The addition-condensation resins include, for example, phenolic resins such as phenol-formalin resin, cresol-formalin resin, modified phenolic resin, phenol-furfural resin, and resorcin resin; amino resins such as urea resin, modified urea resin, melamine resin, guanamine resin, aniline resin, and sulfonamide resin; aromatic hydrocarbon resins such as xylene resin, toluene resin, and alkylbenzene resin; and ketone resins.

The condensation-polymerization resins include, for example, polyester resins such as saturated alkyd resin, unsaturated polyester resin, allyl ester resin, polycarbonate, polyphosphate ester, polysulfonate, and polysulphone; polyamide resins such as nylon 6, nylon 66, modified nylon, nylon 610, amorphous nylon, aromatic nylon fiber, nitrogen-containing cyclic polyamide, polyimide, polymerized fatty acid polyamide, and polyamino acid; silicon resins such as silicone resin, modified silicone resin, and reactive silicone resin; and furan resins.

The addition-polymerization resins include, for example, polyurethane resins such as linear polyurethane, acrylic urethane resin, polyurethane rubber, polyurethane adhesives, and polyurethane paints; and epoxy resins such as glycidyl epoxide and bisphenol type epoxy resins.

The cellulose resins include, for example, cellulose esters such as nitrocellulose, cellulose acetate, cellulose butyrate, and cellulose acetate; and cellulose ethers such as methyl cellulose, ethyl cellulose, benzyl cellulose, carboxymethyl cellulose, hydroxyethyl cellulose, cyanoethyl cellulose, and acrylamide cellulose.

The protein resins include, for example, casein plastic, soybean casein plastic, casein fiber, and starch-vinyl acetate resin.

The cements include, for example, portland cement, blast furnace cement, fly ash cement, magnesia cement, and alumina cement.

The ceramics includes, for example, those containing, as a main ingredient, a mortar which comprises the cements mentioned above, cordierite, or silicon carbide.

The diene rubbers excluded from the base component are natural rubber, polyisoprene rubber, polybutadiene rubber, styrene-butadiene copolymer rubber, and acrylonitrile-butadiene copolymer rubber. The composition of the present invention does not contain diene rubbers.

The weight ratio of the heat-expandable microspheres and/or hollow microspheres contained in the composition of the present invention is not specifically restricted, and should preferably range from 0.1 to 60 weight percent, more preferably from 0.5 to 50 weight percent, further more preferably from 1 to 40 weight percent, yet more preferably from 3 to 30 weight percent, and most preferably from 5 to 15 weight percent to the weight of the base component.

The composition of the present invention can be prepared by blending the base component with the heat-expandable microspheres and/or hollow microspheres.

The composition of the present invention is applied to the fields such as molding composition, paint composition, wax composition, clay/paste composition, fiber composition, glue composition, adhesive composition, sealing composition, powder composition, and binder composition. The composition of the present invention does not include a rubber composition for tire manufacturing.

The formed products of the present invention are manufactured by giving particular shapes to the composition. The formed products of the present invention include, for example, molded articles or formed materials such as coating films. The formed products of the present invention have been improved in their properties, such as lightweight property, porosity, sound absorbency, thermal insulation performance, thermal conductivity, electric conductivity, design effect, shook absorbency, and strength.

EXAMPLE

The present invention is described specifically with the following Examples and Comparative examples, though the present invention is not restricted within the scope of those examples.

The properties of the heat-expandable microspheres and hollow microspheres produced in the following Examples and Comparative examples were measured in the following procedures, and their performance was also evaluated in the following procedures.

[Determination of Average Particle Size and Particle Size Distribution]

A laser diffraction particle size analyzer (HEROS & RODOS, manufactured by SYMPATEC) was employed as the device for the determination. Microspheres were analyzed in dry system with a dry dispersion unit, where the dispersion pressure was controlled at 5.0 bar and the degree of vacuum was controlled at 5.0 mbar. The median particle size ($D_{50}$ value) was determined as an average particle size.

[Determination of True Specific Gravity]

The values of the true specific gravity of heat-expandable microspheres and hollow microspheres obtained by thermally expanding the heat-expandable microspheres were determined in the following method.

The true specific gravity was determined with the liquid substitution method (Archimedean method) with isopropyl alcohol in an atmosphere at 25 deg.C. and 50% RH (relative humidity).

Specifically, an empty 100-cc measuring flask was dried and weighed ($WB_1$), then isopropyl alcohol was poured into the weighed measuring flask to accurately form meniscus, and the measuring flask filled with isopropyl alcohol was weighed ($WB_2$).

The 100-cc measuring flask was then emptied, dried, and weighed ($WS_1$). The weighed measuring flask was then filled with about 50 cc of microspheres, and the measuring flask filled with the microspheres was weighed ($WS_2$). Then isopropyl alcohol was poured into the measuring flask filled with the microspheres to accurately form meniscus without taking bubbles into the isopropyl alcohol, and the flask filled with the microspheres and isopropyl alcohol was weighed ($WS_3$). The values, $WB_1$, $WB_2$, $WS_1$, $WS_2$, and $WS_3$, were introduced into the following expression to calculate the true specific gravity (d) of the microspheres.

$$d = \{(WS_2 - WS_1) \times (WB_2 - WB_1)/100\}/\{(WB_2 - WB_1) - (WS_3 - WS_2)\}$$

Heat-expandable microspheres and hollow microspheres were tested as the microspheres in the above-mentioned method to calculate their true specific gravity.

[Determination of Expansion-Initiating Temperature (Ts) and Maximum-Expansion Temperature (Tm)]

Those temperatures were determined with a DMA (a kinetic viscoelasticity measuring device: DMA Q800, manufactured by TA Instruments). In an aluminum cup 4.8 mm deep and 6.0 mm in diameter (5.65 mm in inside diameter), 0.5 mg of heat-expandable microspheres or heat-expandable microspheres after the heating were placed, and the cup was covered with an aluminum lid 0.1 mm thick and 5.6 mm in diameter to prepare a sample. The sample was subjected to the pressure of 0.01 N with the compression unit of the device, and the height of the sample was measured. The sample was then heated in the temperature range from 20 to 300 deg.C., where the temperature was raised at the rate of 10 deg.C./min, being subjected to the pressure of 0.01 N with the compression unit, and the vertical change of the position of the compression unit was determined. The temperature at which the compression unit started to change its position to the positive direction was determined as the expansion-initiating temperature, and the temperature at which the compression unit indicated the greatest change was determined as the maximum-expansion temperature. If the greatest vertical change of the compression unit to the positive direction given by heat-expandable microspheres before heating in the manner mentioned below is represented by "a", the greatest vertical change of the compression unit to the positive direction given by the heat-expandable microspheres after the heating is represented by "b", the maximum expansion ratio of the heat-expandable microspheres before heating is represented by "A (times)", and the maximum expansion ratio of the heat-expandable microspheres after the heating is represented by "B (times)", then B/A equals to b/a. Thus "b" and "a" were determined and calculated into B/A.

[Determination of the Minimum True Specific Gravity of Microspheres Expanded to the Maximum]

A flat 12 cm long, 13 cm wide, and 9 cm high box was made of aluminum foil, and 1.0 g of heat-expandable microspheres were placed evenly. Then the heating of the microspheres was started at the expansion-initiating temperature which was determined in the measuring method mentioned above. The heating temperature was raised by 5 deg.C. and maintained for 1 minute repeatedly to heat the microspheres, and at each step of temperature raising the true specific gravity of the expanded microspheres (hollow microspheres) was determined in the same manner as in the determination method of true specific gravity mentioned above. The lowest true specific gravity of the results was defined as the minimum true specific gravity of the microspheres expanded to the maximum ($d_{max}$).

[Calculation of Maximum Expansion Ratio of Heat-Expandable Microspheres]

The maximum expansion ratio (times) of heat-expandable microspheres was calculated from the true specific gravity of the heat-expandable microspheres without the heating mentioned above ($d_0$), which was determined in the same manner as that for the true specific gravity mentioned above, and from the minimum true specific gravity of the microspheres at their maximum expansion ($d_{max}$) mentioned above by the following expression.

Maximum expansion ratio of heat-expandable microspheres (times)=$d_0/d_{max}$

[Heating of Microspheres]

In the flat box mentioned above, 1.0 g of heat-expandable microspheres were placed evenly and heated for 10 minutes at several temperature levels which are below the expansion-initiating temperature (Ts) determined in the procedure mentioned above and not lower than the value of Ts−15. After the heating, the heat-expandable microspheres were cooled down to normal temperature (room temperature), and the true specific gravity of the heated and cooled microspheres (d) was determined in the method mentioned above. The true specific gravity of the heat-expandable microspheres before the heating ($d_0$) was also determined in the method mentioned above, and $d/d_0$ was calculated.

[Determination of Repeated-Compression Durability]

In an aluminum cup 4.8 mm deep and 6 mm in diameter (5.65 mm in inside diameter), 10.0 mg of hollow microspheres were placed, and the cup was covered with an aluminum lid 0.1 mm thick and 5.6 mm in diameter to prepare a sample. Then the sample was tested with DMA (DMA Q800, produced by TA Instruments), which compressed the sample on the aluminum lid with its compression unit to subject the sample to the pressure of 2.5 N at 25 deg.C., and determined the thickness of the layer of the hollow microspheres, $L_1$. Then the pressure was raised from 2.5 N to 18 N at a rate of 10 N/min, followed with the reduction of the pressure from 18 N to 2.5 N at the rate of 10 N/min. After repeating the pressure raising and reducing operation 7 times, the thickness of the layer of the hollow microspheres, $L_2$, was determined while the layer was receiving the pressure of 2.5 N by the compression unit which compressed the aluminum lid. Then the ratio between $L_1$ and $L_2$, the thickness values of the layers of the hollow microspheres, was calculated by the following expression and was defined as the repeated-compression durability.

Repeated-compression durability (percent)=$(L_2/L_1)\times 100$

Example 1.1

An aqueous dispersion medium was prepared by adding 100 g of sodium chloride, 80 g of colloidal silica containing 20 weight percent of silica as effective ingredient, 0.1 g of polyvinylpyrolidone, and 0.5 g of 1-% aqueous solution of ethylenediaminetetraacetic acid tetrasodium salt to 600 g of deionized water, and controlling the pH of the mixture to 2.8 to 3.2.

On the other hand, an oily mixture was prepared by mixing 180 g of acrylonitrile, 7C g of methacrylonitrile, 15 g of isobornyl methacrylate, 1.5 g of ethyleneglycol dimethacrylate, 75 g of isopentane as an blowing agent, 9 g of naphthenic oil as a gas migration inhibitor, and 1 g of 2,2'-azobisisobutyronitrile. The aqueous dispersion medium and the oily mixture were mixed, and the mixed liquid was dispersed into a suspension with a Homomixer (T.K. Homo-mixer manufactured by Tokushu Kika Kogyou) at the mixer rotational rate of 5000 rpm for 5 minutes. Then the suspension was transferred into a compressive reactor of 1.5 liter capacity and purged with nitrogen, and the polymerization was performed at 70 deg.C. for 20 hours by agitating the suspension at 80 rpm and controlling the initial reaction pressure at 0.5 MPa. After the polymerization, the polymerized product was filtered and dried to obtain heat-expandable microspheres.

Examples 1.2 and 1.3 and Comparative Example 1.1

Heat-expandable microspheres were produced in the same manner as in Example 1.1 except that the amount of the naphthenic oil was replaced with those shown in Table 1.

Comparative Example 1.2

Heat-expandable microspheres were produced in the same manner as in Example 1.1 except that the blowing agent and gas migration inhibitor used in Example 1.1 were replaced with isododecane (with the boiling point of 177 deg.C., the initial boiling point not higher than 177 deg.C., the kinetic viscosity of 1.35 mm$^2$/S, and the weight average molecular weight of 170.34). The resultant heat-expandable microspheres did not expand in the testing with DMA, and thus their expansion-initiating temperature and maximum-expansion temperature could not be determined. Isododecane is described as a gas migration inhibitor in Table 1.

Example 2.1

An aqueous dispersion medium was prepared by adding 150 g of sodium chloride, 3 g of adipic acid-diethanol amine condensate, 40 g of aqueous colloidal solution of alumina hydrate to 500 g of deionized water, and agitating the mixture uniformly.

An oily mixture was prepared by mixing 100 g of acrylonitrile, 20 g of methacrylonitrile, 70 g of methacrylic acid, 10 g of methacrylamide, 10 g of styrene, 1.0 g of PEG (200) dimethacrylate, 1 g of 2,2'-azobisisobutyronitrile, 40 g of isobutane and 20 g of isooctane as blowing agents, and 9 g of naphthenic oil as a gas migration inhibitor. The aqueous dispersion medium and the oily mixture were mixed, and the mixed liquid was dispersed into a suspension with a Homo-mixer (T.K. Homo-mixer manufactured by Tokushu Kika Kogyou) at a mixer rotational rate of 7000 rpm for 2 minutes. Then the suspension was transferred into a compressive reactor of 1.5 liter capacity and purged with nitrogen, and the polymerization was performed at 70 deg.C. for 20 hours by agitating the suspension at 80 rpm and controlling the initial reaction pressure at 0.5 MPa. After the polymerization, the polymerized product was filtered and dried to obtain heat-expandable microspheres.

Examples 2.2 to 2.8 and Comparative Examples 2.1 to 2.3

Heat-expandable microspheres were produced in the same manner as in Example 2.1 except that the blowing agents and gas migration inhibitor used in Example 2.1 were replaced with the variants with the amounts described in Table 1.

The Ts and Tm of the heat-expandable microspheres obtained in Comparative examples 2.2 and 2.3 could be determined. Those heat-expandable microspheres, however, exhibited low maximum expansion ratio (represented by $d_0/d_{max}$), and thus they had much inferior expanding performance than that of the microspheres obtained in Examples 2.1 to 2.8. The proportion of the maximum expansion ratio of the microspheres after the heating mentioned above to that before the heating (B/A) was low, and the reduction of the expansion ratio of the microspheres after the heating was observed due to gas migration from the microspheres during the heating. In addition, the proportion of the true specific gravity of the microspheres after the heating to that before the heating ($d/d_0$) was much higher. The heat-expandable microspheres obtained in Comparative example 2.2 resulted in high $d/d_0$, and the proportion of the maximum expansion ratio of the microspheres after the heating mentioned above to that before the heating (B/A) was considerably low, which indicated that the blowing agent migrated out of the microspheres during the heating. The microspheres obtained in Comparative example 2.3 resulted in low $d/d_0$, which indicated that the microspheres unexpectedly expanded during the heating.

Example 3.1

An aqueous dispersion medium was prepared by adding 0.1 g of polyvinylpyrolidone, 80 g of colloidal silica containing 20 weight percent of silica as effective ingredient, and 0.5 g of 1-% aqueous solution of ethylenediaminetetraacetic acid tetrasodium salt to 600 g of deionized water, controlling the pH of the mixture to 2.8 to 3.2, and agitating the mixture uniformly.

An oily mixture was prepared by mixing 100 g of acrylonitrile, 180 g of vinylidene chloride, 15 g of methyl methacrylate, 1.0 g of PEG (200) dimethacrylate, 3 g of diisopropyl peroxydicarbonate (PEROYL IPP-50, 50% concentration), 50 g of isobutane as a blowing agent, and 9 g of naphthenic oil as a gas migration inhibitor. The aqueous dispersion medium and the oily mixture were mixed, and the mixed liquid was dispersed into a suspension with a Homomixer (T.K. Homo-mixer manufactured by Tokushu Kika Kogyou) at the mixer rotational rate of 7000 rpm for 2 minutes. Then the suspension was transferred into a compressive reactor of 1.5 liter capacity and purged with nitrogen, and the polymerization was performed at 50 deg.C. for 20 hours by agitating the suspension at 80 rpm and controlling the initial reaction pressure at 0.5 MPa. After the polymerization, the polymerized product was filtered and dried to obtain heat-expandable microspheres.

Example 3.2 and Comparative Example 3

Heat-expandable microspheres were produced in the same manner as in Example 3.1 except that the blowing agent and gas migration inhibitor used in Example 3.1 were replaced with the variants with the amounts described in Table 1.

Example 4.1

An aqueous dispersion medium was prepared by adding 150 g of sodium chloride, 50 g of colloidal silica containing 20 weight percent of silica as effective ingredient, and 0.5 g of 1-% aqueous solution of ethylenediaminetetraacetic acid tetrasodium salt to 500 g of deionized water, controlling the pH of the mixture at 2.8 to 3.2, and agitating the mixture uniformly.

An oily mixture was prepared by mixing 70 g of acrylonitrile, 70 g of methacrylonitrile, 70 g of methacrylic acid, 3 g of ethylene glycol dimethacrylate, 1 g of azobis(2,4-dimethylvaleronitrile), 40 g of isobutane and 20 g of isooctane as blowing agents, and 9 g of naphthenic oil as a gas migration inhibitor. The aqueous dispersion medium and the oily mixture were mixed, and the mixed liquid was dispersed into a suspension with a Homomixer (T.K. Homo-mixer manufactured by Tokushu Kika Kogyou) at a mixer rotational rate of 7000 rpm for 2 minutes. Then the suspension was transferred into a compressive reactor of 1.5 liter capacity and purged with nitrogen, and the polymerization was performed at 60 deg.C. for 20 hours by agitating the suspension at 80 rpm and controlling the initial reaction pressure at 0.5 MPa. After the polymerization, the polymerized product was filtered and dried to obtain heat-expandable microspheres.

Example 4.2 and Comparative Example 4

Heat-expandable microspheres were produced in the same manner as in Example 4.1 except that the blowing agents and gas migration inhibitor used in Example 4.1 were replaced with the variants with the amounts described in Table 1.

Example 5

An aqueous dispersion medium was prepared by adding 90 g of sodium chloride, 50 g of colloidal silica containing 20 weight percent of silica as effective ingredient, and 2.0 g of 1-% aqueous solution of ethylenetriaminepentaacetic acid pentasodium salt to 500 g of deionized water, controlling the pH of the mixture to 2.8 to 3.2, and agitating the mixture uniformly.

An oily mixture was prepared by mixing 170 g of acrylonitrile, 80 g of methacrylonitrile, 20 g of isobornyl methacrylate, 15 g of N-phenyl maleimide, 1.5 g of ethylene glycol dimethacrylate, 1 g of azobis(2,4-dimethylvaleronitrile), 90 g of isopentane as a blowing agent, and 9 g of paraffinic oil as a gas migration inhibitor. The aqueous dispersion medium and the oily mixture were mixed, and the mixed liquid was dispersed into a suspension with a Homomixer (T.K. Homo-mixer manufactured by Tokushu Kika Kogyou) at a mixer rotational rate of 7000 rpm for 1 minutes. Then the suspension was transferred into a compressive reactor of 1.5 liter capacity and purged with nitrogen, and the polymerization was performed at 70 deg.C. for 20 hours by agitating the suspension at 80 rpm and controlling the initial reaction pressure at 0.5 MPa. After the polymerization, the polymerized product was filtered and dried to obtain heat-expandable microspheres.

Comparative Example 5

Heat-expandable microspheres were produced in the same manner as in Example 5 except that the paraffinic oil was not used.

The average particle size, expansion-initiating temperature (Ts), maximum-expansion temperature (Tm), and $d_0/d_{max}$ were determined for the heat-expandable microspheres obtained in the Examples and Comparative examples mentioned above, and the results are shown in Table 1. A part of each of the heat-expandable microspheres was heated under the heating conditions shown in Table 1, and the B/A and $d/d_0$ of the heat-expandable microspheres were determined. The results are shown in Table 1.

The properties of naphthenic oil, aromatic oil, and paraffinic oil used in the Examples and Comparative examples are as follows.

Naphthenic oil: the initial boiling point 210 deg.C., kinetic viscosity at 40 deg.C. 3.4 $mm^2/S$, Cp 92%, weight average molecular weight 180

Aromatic oil: the initial boiling point 290 deg.C., kinetic viscosity at 40 deg.C. 24.7 $mm^2/S$, Ca 95%, weight average molecular weight 200

Paraffinic oil: the initial boiling point 206 deg.C., kinetic viscosity at 40 deg.C. 2.5 $mm^2/S$, Cn 90%, weight average molecular weight 214 tion was spread into 1.5-mm thick film on a 0.8-mm thick Teflon™ sheet (EGF-500-10) placed on an iron plate for electrodeposition coating. Then the film was heated to be gelled in a Geer oven at 120 deg.C. for 10 minutes, and the resultant film was peeled off from the Teflon™ sheet. Thus unexpanded PVC coating film was prepared.

The unexpanded PVC coating film was heated in a Geer oven at 170 deg.C. for 10 minutes to obtain expanded PVC coating film.

TABLE 1

| | | Blowing agent (g) | Gas migration inhibitor | Weight ratio of gas migration inhibitor (%) | Average particle size (micrometer) | Ts (deg. C.)/ Tm (deg. C.) | Heating*1 | B/A | $d_0/d_{max}$ | $d/d_0$ |
|---|---|---|---|---|---|---|---|---|---|---|
| Examples | 1.1 | Isopentane (75) | Naphthenic oil (9) | 10.7 | 23 | 130/179 | 120 × 10 | 1.10 | 83.1 | 0.9 |
| | 1.2 | Isopentane (75) | Naphthenic oil (15) | 16.7 | 25 | 134/180 | 120 × 10 | 0.94 | 77.6 | 1.0 |
| | 1.3 | Isopentane (75) | Naphthenic oil (30) | 28.6 | 25 | 136/183 | 130 × 10 | 0.95 | 80.9 | 1.0 |
| | 2.1 | Isobutane (40) Isooctane (20) | Naphthenic oil (9) | 13.0 | 25 | 160/205 | 150 × 10 | 0.95 | 65.0 | 1.0 |
| | 2.2 | Isobutane (40) Isooctane (20) | Naphthenic oil (15) | 20.0 | 27 | 161/208 | 150 × 10 | 1.00 | 71.7 | 0.8 |
| | 2.3 | Isobutane (15) Isooctane (40) | Naphthenic oil (15) | 21.4 | 29 | 161/211 | 150 × 10 | 1.05 | 78.2 | 0.9 |
| | 2.4 | Isobutane (15) Isooctane (40) | Naphthenic oil (20) | 26.7 | 25 | 163/203 | 150 × 10 | 1.00 | 69.8 | 1.0 |
| | 2.5 | Isobutane(15) Isooctane (40) | Naphthenic oil (30) | 35.3 | 27 | 157/209 | 150 × 10 | 1.10 | 77.8 | 1.1 |
| | 2.6 | Isobutane (10) Isooctane (30) | Naphthenic oil (30) | 42.9 | 30 | 161/209 | 150 × 10 | 1.05 | 76.6 | 0.9 |
| | 2.7 | Isobutane (40) Isooctane (20) | Aromatic oil (9) | 13.0 | 26 | 1602/10 | 150 × 10 | 1.21 | 77.0 | 0.9 |
| | 2.8 | Isobutane (40) Isooctane (20) | Aromatic oil (15) | 20.0 | 25 | 161/208 | 150 × 10 | 1.10 | 70.1 | 1.0 |
| | 3.1 | Isobutane (50) | Naphthenic oil (9) | 15.3 | 13 | 67/121 | 60 × 10 | 0.97 | 27.7 | 0.8 |
| | 3.2 | Isobutane (50) | Naphthenic oil (15) | 23.1 | 13 | 69/122 | 60 × 10 | 1.05 | 28.9 | 0.9 |
| | 4.1 | Isopentane (40) Isooctane (20) | Naphthenic oil (9) | 13.0 | 33 | 153.206 | 140 × 10 | 0.97 | 60.2 | 1.0 |
| | 4.2 | Isopentane (40) Isooctane (20) | Paraffinic oil (9) | 13.0 | 31 | 150/201 | 140 × 10 | 0.90 | 67.4 | 0.9 |
| | 5 | Isopentane (90) | Paraffinic oil (9) | 9.1 | 27 | 146/172 | 140 × 10 | 0.87 | 74.1 | 1.0 |
| Comparative examples | 1.1 | Isopentane (75) | — | 0 | 24 | 131/181 | 120 × 10 | 0.68 | 65.0 | 0.9 |
| | 1.2 | — | Isododecane (84) | 100 | 28 | — | — | — | — | — |
| | 2.1 | Isobutane (40) Isooctane (20) | — | 0 | 24 | 160/207 | 150 × 10 | 0.62 | 77.0 | 1.1 |
| | 2.2 | — | Isododecane (60) | 100 | 27 | 175/207 | 170 × 10 | 0.55 | 14.0 | 1.4 |
| | 2.3 | Isobutane (15) Isooctane (27) | Isododecane (18) | 30 | 28 | 169/193 | 165 × 10 | 0.40 | 4.9 | 0.4 |
| | 3 | Isobutane (50) | — | 0 | 15 | 691/22 | 60 × 10 | 0.69 | 33.7 | 0.7 |
| | 4 | Isopentane (40) Isooctane (20) | — | 0 | 30 | 150/209 | 140 × 10 | 0.55 | 55.4 | 1.2 |
| | 5 | Isopentane (90) | — | 0 | 26 | 144/174 | 140 × 10 | 0.60 | 68.1 | 1.1 |

*1Temperature (deg. C.) × time (min)

Example 6.1

Preparation of a Composition and Unexpanded PVC Coating Film

A composition was prepared by mixing 1 part by weight of the heat-expandable microspheres prepared in Example 1.1, 25 parts by weight of polyvinyl chloride (PVC, supplied by Shin Dai-Ichi Enbi Co., Ltd.), 50 parts by weight of diisononyl phthalate (supplied by New Japan Chemical Co., Ltd.), and 25 parts by weight of calcium carbonate (supplied by Bihoku Funka Kogyo Co., Ltd.). The resultant composi- The specific gravity of the unexpanded PVC coating film (A) and that of the expanded PVC coating film (B) were determined, and the reduced weight ratio of the film after expanding the microspheres (=(A−B)×100/A) was calculated to evaluate the lightening performance of the microspheres.

Examples 6.2 and 6.3 and Comparative Example 6

In Examples 6.2 and 6.3, and in Comparative example 6, unexpanded PVC coating films were prepared and tested in the same manner as in Example 6.1 except that the heat-expandable microspheres used in Example 6.1 was replaced with the heat-expandable microspheres of the Examples and Comparative example shown in Table 2.

The results of Examples 6.1 to 6.3 and Comparative example 6 are shown in Table 2.

TABLE 2

|  | Example 6.1 | Example 6.2 | Example 6.3 | Comparative example 6 |
|---|---|---|---|---|
| Heat-expandable microspheres | Example 1.1 | Example 1.2 | Example 1.3 | Comparative example 1.1 |
| Reduced weight ratio (%) | 25 | 26 | 22 | 17 |

As shown in Table 2, the heat-expandable microspheres produced with a gas migration inhibitor (the microspheres of Examples 6.1 to 6.3) could reduce the specific gravity of the PVC coating films. On the contrary, the heat-expandable microspheres employed for the testing in Comparative example 6 exhibited lower effect in reducing the weight ratio of the PVC coating film after heating. In addition, the film had rough surface which was caused by gas migration from the microspheres.

Example 7.1

Molded Products

A mixture of 3 weight percent of the heat-expandable microspheres obtained in Example 2.1 and 97 weight percent of polypropylene (having a density of 0.9 g/cm$^3$, and a melt flow rate of 14 g/10 min at 230 deg.C.) was injection-molded into disc-shaped molded products being 3 mm thick and 98 mm in diameter with an injection pressure about 1000 kg/cm$^2$ and at three temperature levels, 200 deg.C., 220 deg.C. and 240 deg.C., with an injection molding machine (TS-100, manufactured by Nissei Plastic Industrial Co., Ltd.), which was equipped with a screw feeder of 32-mm diameter and had a mold locking force about 80 tons.

The density of polypropylene, 0.9 (g/cc), and the density of the molded products containing heat-expandable microspheres, A, were calculated into the reduced weight ratio of the molded products (=(0.9−A)×100/0.9) to evaluate the performance of the heat-expandable microspheres to lighten the molded products.

Example 7.2 and Comparative Examples 7.1 and 7.2

In Example 7.2 and Comparative examples 7.1 and 7.2, disc-shaped molded products were produced and evaluated in the same manner as in Example 7.1 except that the heat-expandable microspheres used in Example 7.1 was replaced with the heat-expandable microspheres of the Examples and Comparative examples shown in Table 3.

The results of Examples 7.1 and 7.2 and Comparative examples 7.1 and 7.2 are shown in Table 3.

TABLE 3

|  | Heat-expandable microspheres | Injection molding temperature (deg. C.) | Reduced weight ratio (%) |
|---|---|---|---|
| Example 7.1 | Example 2.1 | 200 | 22 |
|  |  | 220 | 27 |
|  |  | 240 | 27 |
| Example 7.2 | Example 4.1 | 200 | 25 |
|  |  | 220 | 25 |
|  |  | 240 | 23 |
| Comparative example 7.1 | Comparative example 2.1 | 200 | 17 |
|  |  | 220 | 19 |
|  |  | 240 | 15 |
| Comparative example 7.2 | Comparative example 4 | 200 | 20 |
|  |  | 220 | 18 |
|  |  | 240 | 18 |

As shown in table 3, the heat-expandable microspheres containing a gas migration inhibitor resulted in higher degree of reduced weight ratio of molded products. The result implies that the gas migration inhibitor prevented gas migration out of the heat-expandable microspheres and retained the expanding performance of the microspheres in the screw feeder where the polypropylene containing the microspheres was heated. The molded products of Comparative examples 7.1 and 7.2 yellowed much more than those products of Examples 7.1 and 7.2.

Example 8

Hollow Microspheres

One kilogram of the heat-expandable microspheres produced in Example 1.1 and 4 kg of heavy calcium carbonate (WHITON SB Red, with an average particle size of 1.8 micrometer, produced by Shiraishi Calcium Kaisha Ltd.) were fed into a SV Mixer (30 liter capacity, manufactured by KOBELCO Eco-Solutions Co., Ltd.), and mixed for 10 minutes. Then the resultant mixture was transferred into a Lödige mixer (manufactured by Matsubo Corporation), heated with a jacket controlled at 150 deg.C. to raise the temperature of the mixture to 130 deg. C., and then cooled down to obtain hollow microspheres coated with inorganic powder.

The average particle size and true specific gravity of the resultant hollow microspheres coated with inorganic powder were determined, and then the repeated-compression durability of the hollow microspheres was evaluated to indicate their compression durability. The result is shown in Table 4.

Comparative Example 8

Hollow microspheres coated with inorganic powder were produced in the same manner as in Example 8 except that the heat-expandable microspheres produced in Example 1.1 was replaced with the heat-expandable microspheres produced in Comparative example 1. The average particle size and true specific gravity of the resultant hollow microspheres were determined, and then the repeated-compression durability of the hollow microspheres was evaluated. The result is shown in Table 4.

TABLE 4

|  | Average particle size (micrometer) | True specific gravity (g/cc) | Repeated-compression durability (%) |
|---|---|---|---|
| Example 8 | 100 | 0.13 | 67 |
| Comparative example 8 | 95 | 0.13 | 55 |

As shown in Table 4, the hollow microspheres manufactured by processing the heat-expandable microspheres of the present invention have excellent compression durability.

INDUSTRIAL APPLICABILITY

The heat-expandable microspheres of the present invention hold the reduction of their thermal expanding performance if they undergo heat history before their thermal expansion. The hollow microspheres of the present invention release gas or collapse to a minimum degree, and need no excessive heating for thermal expansion so as to yellow much less than conventional microspheres. The composition of the present invention is useful, because void generation in the composition due to gas migration from heated microspheres in the composition is restrained, and the products formed of the composition exhibit minimum dimensional change, which is caused by the re-expansion or shrinkage of thermally expanded microspheres

What is claimed is:

1. Heat-expandable microspheres, each comprising a shell of thermoplastic resin and core material encapsulated in the shell and having an average particle size ranging from 1 to 100 micrometer;
   wherein the core material contains a blowing agent having a boiling point not higher than the softening point of the thermoplastic resin and a gas migration inhibitor having a boiling point higher than the softening point of the thermoplastic resin; and
   wherein the weight ratio of the gas migration inhibitor is at least 1 weight percent and lower than 30 weight percent of the core material.

2. Heat-expandable microspheres, each comprising a shell of thermoplastic resin and core material encapsulated in the shell and having an average particle size ranging from 1 to 100 micrometer;
   wherein the core material contains a blowing agent having a boiling point not higher than the softening point of the thermoplastic resin and a gas migration inhibitor having a boiling point higher than the softening point of the thermoplastic resin; and
   wherein the initial boiling point of the gas migration inhibitor is at least 180 deg.C.

3. The heat-expandable microspheres according to claim 1, wherein the gas migration inhibitor is at least one member selected from the group consisting of naphthenic oils, paraffinic oils, and aromatic oils.

4. The heat-expandable microspheres according to claim 2, wherein the gas migration inhibitor is at least one member selected from the group consisting of naphthenic oils, paraffinic oils, and aromatic oils.

5. Heat-expandable micro spheres, each comprising a shell of thermoplastic resin and core material encapsulated in the shell and having an average particle size ranging from 1 to 100 micrometer;
   wherein the core material essentially contains a blowing agent having a boiling point not higher than the softening point of the thermoplastic resin; and
   wherein B/A is at least 0.7 in the case that the heat-expandable microspheres having an expansion-initiating temperature Ts (deg.C.) and a maximum expansion ratio A (times) are heated for 10 minutes at T (deg.C.) satisfying the relation of (Ts−15)≦T<Ts and thereafter cooled down to room temperature, and the resultant heat-expandable microspheres have a maximum expansion ratio B (times).

6. The heat-expandable microspheres according to claim 5, wherein the ratio of the true specific gravity of the heat-expandable microspheres after the heating (d) to the true specific gravity of the heat-expandable microspheres before the heating ($d_0$), which is represented by $d/d_0$, ranges from 0.5 to 1.3.

7. The heat-expandable microspheres according to claim 1, wherein the thermoplastic resin is produced by polymerizing a polymerizable component, and the polymerizable component contains, as a monomer component, at least one member selected from the group consisting of nitrile monomers, (meth)acrylate monomers, carboxyl-group-containing monomers, styrene monomers, vinyl acetate, (meth)acrylamide monomers, maleimide monomers, and vinylidene chloride.

8. The heat-expandable microspheres according to claim 2, wherein the thermoplastic resin is produced by polymerizing a polymerizable component, and the polymerizable component contains, as a monomer component, at least one member selected from the group consisting of nitrile monomers, (meth)acrylate monomers, carboxyl-group-containing monomers, styrene monomers, vinyl acetate, (meth)acrylamide monomers, maleimide monomers, and vinylidene chloride.

9. The heat-expandable microspheres according to claim 5, wherein the thermoplastic resin is produced by polymerizing a polymerizable component, and the polymerizable component contains, as a monomer component, at least one member selected from the group consisting of nitrile monomers, (meth)acrylate monomers, carboxyl-group-containing monomers, styrene monomers, vinyl acetate, (meth)acrylamide monomers, maleimide monomers, and vinylidene chloride.

10. The heat-expandable microspheres according to claim 1, having a maximum expansion temperature in the range from 120 deg.C. to 240 deg.C.

11. The heat-expandable microspheres according to claim 2, having a maximum expansion temperature in the range from 120 deg.C. to 240 deg.C.

12. The heat-expandable microspheres according to claim 5, having a maximum expansion temperature in the range from 120 deg.C. to 240 deg.C.

13. The heat-expandable microspheres according to claim 1, further comprising a particulate filler being adhered on the outer surface of the shell of the heat-expandable microspheres.

14. The heat-expandable microspheres according to claim 2, further comprising a particulate filler being adhered on the outer surface of the shell of the heat-expandable microspheres.

15. The heat-expandable microspheres according to claim 5, further comprising a particulate filler being adhered on the outer surface of the shell of the heat-expandable microspheres.

16. Hollow microspheres produced by thermally expanding the heat-expandable microspheres according to claim 1.

17. Hollow microspheres produced by thermally expanding the heat-expandable microspheres according to claim 2.

18. Hollow microspheres produced by thermally expanding the heat-expandable microspheres according to claim 5.

19. A composition comprising a base component except diene rubbers, and the heat-expandable microspheres according to claim 1.

20. A composition comprising a base component except diene rubbers, and the heat-expandable microspheres according to claim 2.

21. A composition comprising a base component except diene rubbers, and the heat-expandable microspheres according to claim 5.

22. A composition comprising a base component except diene rubbers, and the hollow microspheres according to claim 16.

23. A composition comprising a base component except diene rubbers, and the hollow microspheres according to claim 17.

24. A composition comprising a base component except diene rubbers, and the hollow microspheres according to claim 18.

25. A formed product produced by giving a shape to the composition according to claim 19.

26. A formed product produced by giving a shape to the composition according to claim 20.

27. A formed product produced by giving a shape to the composition according to claim 21.

* * * * *